US012811712B2

(12) United States Patent
Wang

(10) Patent No.: US 12,811,712 B2
(45) Date of Patent: Nov. 24, 2026

(54) RANGING RATE SWITCH CONTROL METHOD AND COMMUNICATION APPARATUS

(71) Applicant: HUAWEI TECHNOLOGIES CO., LTD., Shenzhen (CN)

(72) Inventor: Kang Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 18/620,637

(22) Filed: Mar. 28, 2024

(65) Prior Publication Data

US 2024/0243833 A1 Jul. 18, 2024

Related U.S. Application Data

(63) Continuation of application No. PCT/CN2021/122221, filed on Sep. 30, 2021.

(51) Int. Cl.
*H04L 1/00* (2006.01)
*G01S 11/02* (2010.01)

(52) U.S. Cl.
CPC ............ *H04L 1/0002* (2013.01); *G01S 11/02* (2013.01)

(58) Field of Classification Search
CPC ........ H04L 1/0002; G01S 11/02; G01S 7/006; G01S 13/765
See application file for complete search history.

(56) References Cited

U.S. PATENT DOCUMENTS

2005/0058107 A1* 3/2005 Salokannel ............... H04L 1/18 370/428
2007/0104215 A1* 5/2007 Wang .................... H04L 47/724 370/458
2008/0205358 A1* 8/2008 Jokela .................. H04W 28/22 370/338

(Continued)

FOREIGN PATENT DOCUMENTS

CN 110248341 A 9/2019

OTHER PUBLICATIONS

Mohammadmoradi et al., "UWB Physical Layer Adaptation for Best Ranging Performance within Application Constraints," Proceedings of the 2nd International Conference on Smart Digital Environment, XP093209542, total 9 pages (Oct. 2018).

*Primary Examiner* — Dady Chery
(74) *Attorney, Agent, or Firm* — Leydig, Voit & Mayer, Ltd.

(57) ABSTRACT

A ranging rate switch control method and a communication apparatus are provided. The method includes: when performing a current UWB ranging process with a second node, a first node receives rate indication information from the second node, where the rate indication information indicates a first data transmission rate available to the second node. The first node determines, based on the first data transmission rate indicated by the rate indication information and communication link quality of the first node, a target ranging rate at which a next UWB ranging process is performed with the second node. In the solution provided in this application, switch control is performed on a data transmission rate used by a node that performs ranging in a ranging process, so that flexibility of ranging control can be improved, and ranging performance can be improved.

16 Claims, 7 Drawing Sheets

(56) References Cited

U.S. PATENT DOCUMENTS

| | | | | |
|---|---|---|---|---|
| 2019/0263356 | A1 | 8/2019 | Golsch et al. | |
| 2020/0228943 | A1* | 7/2020 | Martin | G01S 5/02 |
| 2020/0359275 | A1* | 11/2020 | Li | H04W 74/002 |

* cited by examiner

RANGING RATE SWITCH CONTROL METHOD AND COMMUNICATION APPARATUS

CROSS-REFERENCE TO RELATED APPLICATIONS

This application is a continuation of International Application No. PCT/CN2021/122221, filed on Sep. 30, 2021, the disclosure of which is hereby incorporated by reference in its entirety.

TECHNICAL FIELD

Embodiments of this application relate to the field of communication technologies, and in particular, to a ranging rate switch control method and a communication apparatus.

BACKGROUND

With the development of science and technology, the ranging and positioning technology is increasingly widely used. A conventional global positioning system (GPS) needs to receive a satellite signal, but an indoor positioning application cannot receive the satellite signal. Therefore, the GPS cannot implement indoor positioning. In addition, positioning accuracy of the GPS is generally within a meter-level range, which cannot satisfy a requirement for high-precision positioning. Communication systems such as wireless fidelity (Wi-Fi) and Bluetooth (BT) can implement indoor ranging and positioning, but precision is low, which is usually within a range of 1 to 10 meters. In current indoor ranging and positioning application scenarios, such as industrial workshop positioning, mobile phone ranging, and object searching, high-precision ranging and positioning are generally completed based on an ultra wide band (UWB) technology.

The UWB technology is a new wireless communication technology, which can implement centimeter-level positioning precision, has characteristics of high time resolution and a strong anti-multipath capability, and can still implement ranging and positioning in a complex multipath environment. Therefore, the UWB technology can be widely applied to high-precision ranging and positioning scenarios.

Currently, when ranging is performed between different nodes based on the UWB technology, a default UWB network parameter is generally negotiated or formulated by using a communication system such as Bluetooth or near field communication (NFC), and then UWB networking and a ranging task after networking are performed based on the default UWB network parameter. In this process, after establishing UWB communication, two nodes that perform ranging keep using a fixed ranging rate (namely, a data transmission rate in the default UWB network parameter) to perform data transmission. However, in an actual application, a channel environment between the nodes often changes. If a physical channel with a ranging rate keeps being used, a probability of data retransmission and an error packet is high, which may cause problems of high power consumption and poor ranging performance, and even a ranging failure. In addition, a ranging procedure greatly depends on another communication system. If a UWB network parameter needs to be modified in the ranging process, a UWB communication network corresponding to a new UWB network parameter needs to be established by using the communication system such as Bluetooth or near field communication.

Therefore, a current ranging method based on the UWB communication technology has problems of poor flexibility and poor ranging performance.

SUMMARY

Embodiments of this application provide a ranging rate switch control method and a communication apparatus, so as to switch control of a ranging rate used by a ranging node in a ranging process, thereby improving flexibility of ranging control and improving ranging performance.

According to a first aspect, this application provides a ranging rate switch control method. The method includes: When performing a current UWB ranging process with a second node, a first node receives rate indication information from the second node, where the rate indication information indicates a first data transmission rate available to the second node. The first node determines, based on the first data transmission rate indicated by the rate indication information and communication link quality of the first node, a target ranging rate at which a next UWB ranging process is performed with the second node.

In the method, when the first node performs the current UWB ranging process with the second node, the first node may respectively determine, based on the rate indication information from the second node and the communication link quality of the first node, available data transmission rates of the first node and the second node, so as to determine a ranging rate at which the next UWB ranging process is performed with the second node. Based on this solution, the first node may determine, through negotiation with the second node, a ranging rate supported by both parties, and use the ranging rate when performing the next ranging process. Therefore, when performing the UWB ranging process with the second node, the first node can perform flexible switch control of the ranging rate used in the UWB ranging process, so as to select a ranging rate most suitable for a current environment to perform the UWB ranging process. Therefore, in comparison with a solution in which two nodes keep using a fixed ranging rate to perform the ranging procedure after establishing UWB communication in the prior art, this solution may be used to select an optimal ranging rate in a targeted manner, and reduces a probability of retransmission and error data (packet) transmission in the ranging process as much as possible, thereby improving ranging performance. In addition, power consumption may be reduced to some extent, execution of the ranging procedure may be accelerated, and ranging performance may be further improved. In addition, because a rate negotiation of rate switch is performed between the first node and the second node that establish UWB communication, the first node and the second node may interact based on a UWB communication manner. Therefore, dependency on another communication system or communication manner may be reduced, a ranging rate switch procedure may be simplified, and switch efficiency may be improved.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In the method, different data transmission rates correspond to different link quality parameters, so that a node can select a suitable data transmission rate based on link quality of a communication link to perform data transmission. The first data transmission rate is a corresponding data transmission rate determined based on the communication link quality of the second node, and may reflect a ranging rate currently suitable for the second node. Therefore, the first node may determine, based on the rate indication information, the first data transmission rate currently suitable for the second node, and may further determine, with reference to the communication link quality of the first node, a ranging rate used when the next UWB ranging process is performed.

In a possible design, the determining, by the first node based on the first data transmission rate indicated by the rate indication information and communication link quality of the first node, a target ranging rate used at which a next UWB ranging process is performed with the second node includes: The first node determines a second data transmission rate of the first node based on the communication link quality of the first node, where the second data transmission rate is a data transmission rate corresponding to a second link quality parameter in the plurality of candidate data transmission rates, and the second link quality parameter indicates the communication link quality of the first node; and the first node determines the target ranging rate based on the first data transmission rate and the second data transmission rate.

In the method, the first node may quickly determine, based on the communication link quality of the first node and a correspondence between different data transmission rates and link quality parameters, a data transmission rate currently suitable for the first node, and may further determine the target ranging rate with reference to a data transmission rate currently suitable for the second node, thereby ensuring that the target ranging rate determined by the first node is acceptable to both the first node and the second node.

In a possible design, the determining, by the first node, the target ranging rate based on the first data transmission rate and the second data transmission rate includes: When the first data transmission rate is the same as the second data transmission rate and is different from a data transmission rate used in performing the current UWB ranging process, the first node use the first data transmission rate as the target ranging rate; or when the first data transmission rate is different from the second data transmission rate or the first data transmission rate is the same as a data transmission rate used in performing the current UWB ranging process, the first node uses the data transmission rate used in performing the current UWB ranging process as the target ranging rate.

In the method, normal communication quality can be ensured only when the first node and the second node use a same data transmission rate. Therefore, the first node may compare data transmission rates available to the first node and the second node, and compare the data transmission rates with a currently used data transmission rate, and determine, based on a comparison result, whether it is necessary and whether a currently used ranging rate can be switched, so that accurate control of ranging rate switch can be implemented, and communication quality between the first node and the second node is ensured.

In a possible design, the method further includes: When the first node uses the first data transmission rate as the target ranging rate, the first node sends a rate switch indication to the second node, where the rate switch indication indicates the second node to switch a ranging rate of the second node to the target ranging rate when the next UWB ranging process is performed; and the first node switches a ranging rate of the first node to the target ranging rate when the next UWB ranging process is performed.

In the method, the first node indicates a new ranging rate to the second node, so that the second node switches the ranging rate when performing the next UWB ranging process, and the first node also switches the ranging rate when performing the next UWB ranging process. Therefore, the first node and the second node can synchronously switch the ranging rate.

In a possible design, the sending, by the first node, a rate switch indication to the second node includes: The first node sends the rate switch indication to the second node through forwarding by a management node, where the management node is configured to manage the first node and the second node.

In a UWB ranging scenario, the management node may manage the two ranging nodes in a unified manner, and related parameters in the ranging process between the two nodes may also be controlled by the management node. Therefore, in the method, the first node indicates, in a manner of forwarding by the management node, the second node to switch the ranging rate, so that a control manner of parameter switch in the UWB ranging scenario may be adapted, and the management node may uniformly control the first node and the second node.

In a possible design, after the first node sends the rate switch indication to the second node through forwarding by a management node, and before the first node performs the next UWB ranging process, the method further includes: The first node receives the rate switch indication from the management node, where the rate switch indication further indicates the first node to switch the ranging rate of the first node to the target ranging rate when the next UWB ranging process is performed.

In the method, the first node may switch the ranging rate based on an indication of the management node, which is the same as that of the second node. Therefore, a control manner of parameter switch in the UWB ranging scenario may be adapted, and the management node may uniformly control the first node and the second node.

In a possible design, before the receiving, by a first node, rate indication information from the second node, the method further includes: The first node sends a rate switch request to the second node, where the rate switch request requests the second node to feed back the rate indication information.

In the method, the first node may control initiation of ranging rate switch, thereby improving flexibility of ranging rate switch control.

In a possible design, the sending, by the first node, a rate switch request to the second node includes: The first node sends a first ranging frame that carries the rate switch request to the second node, where the first ranging frame indicates the second node to feed back a second ranging frame; and the receiving, by a first node, rate indication information from the second node includes: The first node receives the second ranging frame that is from the second node and that carries the rate indication information.

In this method, in the UWB ranging procedure, a ranging frame may be transmitted between nodes, and a range between the nodes is calculated based on a transmission time of the ranging frame. Therefore, the first node uses the transmission rate switch request and the rate indication information of an existing ranging frame in the UWB ranging process, so that additional resource consumption and impact on an existing UWB ranging procedure may be reduced, and feasibility of the solution may be improved.

According to a second aspect, this application provides a ranging rate switch control method. The method includes: When performing a current UWB ranging process with a first node, a second node sends rate indication information to the first node, where the rate indication information indicates a first data transmission rate available to the second node.

In the method, when performing the current UWB ranging process with the first node, the second node indicates a data transmission rate available to the second node to the first node through the rate indication information. In this case, the first node may perform some processing processes through the data transmission rate available to the second node as a reference, for example, perform a process of determining a ranging rate used at which a next ranging process is performed with the first node and the second node. Based on this solution, when determining the ranging rate used at which the next UWB ranging process with the second node, the first node can fully refer to the data transmission rate available to the second node, so that a ranging rate supported by both parties may be determined and used when the next ranging process is performed. Therefore, when performing the UWB ranging process with the first node, the second node can cooperate with the first node to perform flexible switch control of the ranging rate used in the UWB ranging process, so as to select a most suitable ranging rate to perform the UWB ranging process. In this way, in comparison with a solution in which two nodes keep using a fixed ranging rate to perform the ranging procedure after establishing UWB communication in the prior art, this solution facilitates to select an optimal ranging rate in a targeted manner, and reduces a probability of retransmission and error data (packet) transmission in the ranging process as much as possible, thereby improving ranging performance. In addition, power consumption may be reduced to some extent, execution of the ranging procedure may be accelerated, and ranging performance may be further improved. In addition, the first node and the second node may interact based on a UWB communication manner. Therefore, dependency on another communication system or communication manner may be reduced, a ranging rate switch procedure may be simplified, and switch efficiency may be improved.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In the method, different data transmission rates correspond to different link quality parameters, so that a node can select a suitable data transmission rate based on link quality of a communication link to perform data transmission. The first data transmission rate is a corresponding data transmission rate determined based on the communication link quality of the second node, and may reflect a ranging rate currently suitable for the second node. Therefore, the second node sends the first data transmission rate to the first node, so that the first node may determine, with reference to the first data transmission rate, a ranging rate that is used in the next UWB ranging process and that can be supported by the second node.

In a possible design, the method further includes: The second node receives a rate switch indication from the first node. The second node switches a ranging rate of the second node to a target ranging rate based on the rate switch indication when a next ranging process is performed with the first node.

In the method, the second node switches the ranging rate based on an indication of the first node when performing the next ranging process, which can be ensured that the second node and the first node synchronously switch the ranging rate, thereby improving accuracy of ranging rate switch.

In a possible design, the receiving, by the second node, a rate switch indication from the first node includes: The second node receives the rate switch indication that is from the first node and forwarded by a management node, where the management node is configured to manage the first node and the second node.

In the UWB ranging scenario, the management node may manage the two ranging nodes in a unified manner, and related parameters in the ranging process between the two nodes may be controlled by the management node. Therefore, in this method, the second node receives, in a manner of forwarding by the management node, an indication for performing ranging rate switch by the first node, so that a control manner of parameter switch in the UWB ranging scenario may be adapted, and the management node may uniformly control the first node and the second node.

In a possible design, before the sending, by a second node, rate indication information to the first node, the method further includes: The second node receives a rate switch request from the first node, where the rate switch request requests the second node to feed back the rate indication information.

In the method, the second node may perform corresponding feedback based on an indication of the first node, so that the first node may control initiation of ranging rate switch, thereby improving flexibility of ranging rate switch control.

In a possible design, the receiving, by the second node, a rate switch request from the first node includes: The second node receives a first ranging frame that is from the first node and that carries the rate switch request, where the first ranging frame indicates the second node to feed back a second ranging frame; and the sending, by a second node, rate indication information to the first node includes: The second node sends the second ranging frame that carries the rate indication information to the first node.

In this method, in the UWB ranging procedure, a ranging frame may be transmitted between nodes, and a range between the nodes is calculated based on a transmission time of the ranging frame. Therefore, the second node uses the transmission rate switch request and the rate indication information of an existing ranging frame in the UWB ranging process, so that additional resource consumption and impact on an existing UWB ranging procedure may be reduced, and feasibility of the solution may be improved.

According to a third aspect, this application provides a ranging rate switch control method, including: When a current UWB ranging process is performed by a first node and a second node, a management node receives a rate switch indication from the first node, where the rate switch indication indicates the second node to switch a ranging rate of the second node to a target ranging rate when a next UWB ranging process is performed with the first node. The management node sends the rate switch indication to the second node.

In a UWB ranging scenario, the management node is used as a controller and may control a ranging process of the management node and a secondary node. Therefore, in this method, when the UWB ranging process is performed by the first node and the second node, the management node may control an execution process of the first node and the second node. When determining to switch the ranging rate, the first node sends rate switch indication information to the management node, and the management node may control switch of the ranging rate of the second node based on the rate switch indication information, then the first node indirectly controls the second node, so that the second node can switch the ranging rate together with the first node, thereby ensuring consistency and synchronization of ranging rate switch performed by the first node and the second node. In addition, flexible switch control can be implemented on the ranging rate used by the first node and the second node in the UWB ranging process, so as to select a most suitable ranging rate to perform the UWB ranging process, thereby improving ranging performance.

In a possible design, the method further includes: The management node sends the rate switch indication to the first node, where the rate switch indication further indicates the first node to switch the ranging rate of the first node to the target ranging rate when the next UWB ranging process is performed.

In the method, after indicating the second node to switch a ranging rate when the next UWB ranging process is performed, the management node further indicates the first node to switch a ranging rate when the next UWB ranging process is performed, so that consistency and synchronization of ranging rate switch performed by the first node and the second node may be ensured.

According to a fourth aspect, this application provides a communication apparatus, used in a first node, where the communication apparatus includes a transceiver unit and a processing unit. The transceiver unit is configured to: when performing a current UWB ranging process with a second node, receive rate indication information from the second node, where the rate indication information indicates a first data transmission rate available to the second node. The processing unit is configured to determine, based on the first data transmission rate indicated by the rate indication information and communication link quality of the first node, a target ranging rate at which a next UWB ranging process is performed with the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, when determining, based on the first data transmission rate indicated by the rate indication information and the communication link quality of the first node, the target ranging rate at which the next UWB ranging process is performed with the second node, the processing unit is specifically configured to: determine a second data transmission rate of the first node based on the communication link quality of the first node, where the second data transmission rate is a data transmission rate corresponding to a second link quality parameter in the plurality of candidate data transmission rates, and the second link quality parameter indicates the communication link quality of the first node; and determine the target ranging rate based on the first data transmission rate and the second data transmission rate.

In a possible design, when determining the target ranging rate based on the first data transmission rate and the second data transmission rate, the processing unit is specifically configured to: when the first data transmission rate is the same as the second data transmission rate and is different from a data transmission rate used in performing the current UWB ranging process, use the first data transmission rate as the target ranging rate; or when the first data transmission rate is different from the second data transmission rate or the first data transmission rate is the same as a data transmission rate used in performing the current UWB ranging process, use the data transmission rate used in performing the current UWB ranging process as the target ranging rate.

In a possible design, the processing unit is further configured to: when the first data transmission rate is used as the target ranging rate, send a rate switch indication to the second node through the transceiver unit, where the rate switch indication indicates the second node to switch a ranging rate of the second node to the target ranging rate when the next UWB ranging process is performed; and switch a ranging rate of the first node to the target ranging rate when the next UWB ranging process is performed.

In a possible design, when sending the rate switch indication to the second node through the transceiver unit, the processing unit is specifically configured to: enable the transceiver unit to send the rate switch indication to the second node through forwarding by a management node, where the management node is configured to manage the first node and the second node.

In a possible design, before the transceiver unit receives the rate indication information from the second node, the transceiver unit is further configured to send a rate switch request to the second node, where the rate switch request requests the second node to feed back the rate indication information.

In a possible design, when sending the rate switch request to the second node, the transceiver unit is specifically configured to send a first ranging frame that carries the rate switch request to the second node, where the first ranging frame indicates the second node to feed back a second ranging frame; and when receiving the rate indication information from the second node, the transceiver unit is specifically configured to receive the second ranging frame that is from the second node and that carries the rate indication information by the first node.

According to a fifth aspect, this application provides a communication apparatus, used in a second node, where the communication apparatus includes a transceiver unit and a processing unit. The processing unit is configured to: when performing a current UWB ranging process with a first node, send rate indication information to the first node through the transceiver unit, where the rate indication information indicates the first data transmission rate available to the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, the processing unit is further configured to: receive a rate switch indication from the first node through the transceiver unit; and switch, based on the rate switch indication, a ranging rate of the second node to a target ranging rate when a next ranging process is performed with the first node.

In a possible design, the receiving, by the processing unit, a rate switch indication from the first node through the transceiver unit includes: enabling the transceiver unit to receive the rate switch indication that is from the first node and forwarded by a management node, where the management node is configured to manage the first node and the second node.

In a possible design, before the processing unit sends the rate indication information to the first node through the transceiver unit, the processing unit is further configured to receive a rate switch request from the first node through the transceiver unit, where the rate switch request requests the second node to feed back the rate indication information.

In a possible design, when receiving the rate switch request from the first node through the transceiver unit, the processing unit is specifically configured to receive, through the transceiver unit, a first ranging frame that is from the first node and that carries the rate switch request, where the first ranging frame indicates the second node to feed back a second ranging frame; and when sending the rate indication information to the first node through the transceiver unit, the processing unit is specifically configured to send the second ranging frame that carries the rate indication information to the first node through the transceiver unit.

According to a sixth aspect, this application provides a communication apparatus, used in a management node, where the communication apparatus includes a transceiver unit and a processing unit. The processing unit is configured to: when a current UWB ranging process is performed by a first node and a second node, receive a rate switch indication from the first node through the transceiver unit, where the rate switch indication indicates the second node to switch a ranging rate of the second node to a target ranging rate when a next UWB ranging process is performed with the first node. The processing unit sends the rate switch indication to the second node through the transceiver unit.

In a possible design, the processing unit is further configured to send the rate switch indication to the first node through the transceiver unit, where the rate switch indication further indicates the first node to switch the ranging rate of the first node to the target ranging rate when the next UWB ranging process is performed.

According to a seventh aspect, this application provides a communication apparatus, used in a first node, where the communication apparatus includes a transceiver and a processor. The transceiver is configured to: when performing a current UWB ranging process with a second node, receive rate indication information from the second node, where the rate indication information indicates a first data transmission rate available to the second node. The processor is configured to determine, based on the first data transmission rate indicated by the rate indication information and communication link quality of the first node, a target ranging rate at which a next UWB ranging process is performed with the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, when determining, based on the first data transmission rate indicated by the rate indication information and the communication link quality of the first node, the target ranging rate at which the next UWB ranging process is performed with the second node, the processor is specifically configured to: determine a second data transmission rate of the first node based on the communication link quality of the first node, where the second data transmission rate is a data transmission rate corresponding to a second link quality parameter in the plurality of candidate data transmission rates, and the second link quality parameter indicates the communication link quality of the first node; and determine the target ranging rate based on the first data transmission rate and the second data transmission rate.

In a possible design, when determining the target ranging rate based on the first data transmission rate and the second data transmission rate, the processor is specifically configured to: when the first data transmission rate is the same as the second data transmission rate and is different from a data transmission rate used in performing a current UWB ranging process, use the first data transmission rate as the target ranging rate; or when the first data transmission rate is different from the second data transmission rate or the first data transmission rate is the same as a data transmission rate used in performing the current UWB ranging process, use the data transmission rate used in performing the current UWB ranging process as the target ranging rate.

In a possible design, the processor is further configured to: when the first data transmission rate is used as the target ranging rate, send a rate switch indication to the second node through the transceiver, where the rate switch indication indicates the second node to switch a ranging rate of the second node to the target ranging rate when the next UWB ranging process is performed; and switch a ranging rate of the first node to the target ranging rate when the next UWB ranging process is performed.

In a possible design, when sending the rate switch indication to the second node through the transceiver, the processor is specifically configured to enable the transceiver to send the rate switch indication to the second node through forwarding by a management node, where the management node is configured to manage the first node and the second node.

In a possible design, before the transceiver receives the rate indication information from the second node, the transceiver is further configured to send a rate switch request to the second node, where the rate switch request requests the second node to feed back the rate indication information.

In a possible design, when sending the rate switch request to the second node, the transceiver is specifically configured to send a first ranging frame that carries the rate switch request to the second node, where the first ranging frame indicates the second node to feed back a second ranging frame; and when receiving the rate indication information from the second node, the transceiver is specifically configured to receive the second ranging frame that is from the second node and that carries the rate indication information by the first node.

According to an eighth aspect, this application provides a communication apparatus, used in a second node. The communication apparatus includes a transceiver and a processor. The processor is configured to: when performing a current UWB ranging process with a first node, send rate indication information to the first node through the transceiver, where the rate indication information indicates the first data transmission rate available to the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, the processor is further configured to: receive a rate switch indication from the first node through the transceiver; and switch, based on the rate switch indication, a ranging rate of the second node to a target ranging rate when a next ranging process is performed with the first node.

In a possible design, the receiving, by the processor, a rate switch indication from the first node through the transceiver includes: enabling the transceiver to receive the rate switch indication that is from the first node and forwarded by a management node, where the management node is configured to manage the first node and the second node.

In a possible design, before the processor sends the rate indication information to the first node through the transceiver, the processor is further configured to receive a rate switch request from the first node through the transceiver, where the rate switch request requests the second node to feed back the rate indication information.

In a possible design, when receiving the rate switch request from the first node through the transceiver, the processor is specifically configured to receive, through the transceiver, a first ranging frame that is from the first node and that carries the rate switch request, where the first ranging frame indicates the second node to feed back a second ranging frame; and when sending the rate indication information to the first node through the transceiver, the processor is specifically configured to send the second ranging frame that carries the rate indication information to the first node through the transceiver.

According to a ninth aspect, this application provides a communication apparatus, used in a management node, where the communication apparatus includes a transceiver and a processor. The processor is configured to: when a current UWB ranging process is performed by a first node and a second node, receive a rate switch indication from the first node through the transceiver, where the rate switch indication indicates the second node to switch a ranging rate of the second node to a target ranging rate when a next UWB ranging process is performed with the first node. The processor sends the rate switch indication to the second node through the transceiver.

In a possible design, the processor is further configured to send the rate switch indication to the first node through the transceiver, where the rate switch indication further indicates the first node to switch a ranging rate of the first node to the target ranging rate when the next UWB ranging process is performed.

According to a tenth aspect, this application provides a computer-readable storage medium, where the computer-readable storage medium stores a computer-readable program, and when the computer-readable program is run on a computer, the computer is enabled to perform the method described in the first aspect or any possible design of the first aspect, or the computer is enabled to perform the method described in the second aspect or any possible design of the second aspect, or the computer is enabled to perform the method described in the third aspect or any possible design of the third aspect.

According to an eleventh aspect, this application provides a computer program product. When the computer program product is run on a computer, the computer is enabled to perform the method described in any one of the first aspect or the possible designs of the first aspect, or the computer is enabled to perform the method described in any one of the second aspect or the possible designs of the second aspect, or the computer is enabled to perform the method described in any one of the third aspect or the possible designs of the third aspect.

According to a twelfth aspect, this application provides a chip. The chip is configured to read a computer program stored in a memory, to perform the method described in any one of the first aspect or the possible designs of the first aspect, or perform the method described in any one of the second aspect or the possible designs of the second aspect, or perform the method described in any one of the third aspect or the possible designs of the third aspect.

According to a thirteenth aspect, an embodiment of this application provides a chip system. The chip system includes a processor, configured to support a computer apparatus in implementing the method described in any one of the first aspect or the possible designs of the first aspect, or implementing the method described in any one of the second aspect or the possible designs of the second aspect, or implementing the method described in any one of the third aspect or the possible designs of the third aspect.

In a possible design, the chip system further includes a memory, and the memory is configured to store a program and data that are necessary for the computer apparatus.

In a possible design, the chip system includes a chip, or includes a chip and another discrete device.

For beneficial effects of the fourth aspect to the thirteenth aspect, refer to descriptions of beneficial effects of the first aspect, the second aspect, or the third aspect. Details are not described herein again.

DESCRIPTION OF EMBODIMENTS

Figure 1A:
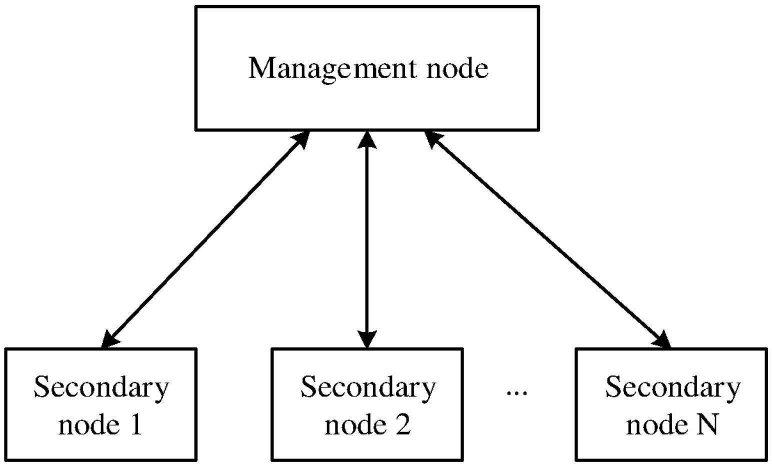
FIG. 1*a* is a schematic architectural diagram of a UWB ranging system.

To make objectives, technical solutions, and advantages of embodiments of this application clearer, the following further describes embodiments of this application in detail with reference to the accompanying drawings. The terms “first” and “second” below in the description of embodiments of this application are merely used for a description purpose, and shall not be understood as an indication or implication of relative importance or implicit indication of a quantity of indicated technical features. Therefore, a feature limited by “first” or “second” may explicitly or implicitly include one or more features.

For ease of understanding, examples of descriptions of concepts related to this application are provided for reference.

1. UWB is a wireless carrier communication technology that uses ultra wide band baseband pulses with an extremely wide spectrum for communication. The UWB technology uses nanosecond-level non-sine wave narrow pulses to transmit data. Therefore, the UWB technology occupies a large spectrum range. Although wireless communication is used, a data transmission rate of the UWB technology can reach hundreds of megabits per second. The UWB technology has the advantages of low system complexity, low transmission signal power spectral density, insensitivity to channel fading, low interception capability, high positioning precision, and the like. It is especially applicable to high-speed wireless access in densely-populated multipath areas such as indoor areas.

UWB ranging refers to a measurement of the range between different nodes based on a UWB communication technology. A principle of the UWB ranging is to calculate the range between nodes based on the transmission time and speed (usually the speed of light) of wireless signals between the nodes.

The ranging rate in this embodiment of this application refers to a data transmission rate used by a node in a UWB ranging process. The data transmission rate refers to a data volume of data transmitted on a communication link in a unit time. In different channel environments (or communication link environments), data transmission rates suitable for nodes are different.

2) A management node is a node that sends data scheduling information. The management node may manage a secondary node that establishes a communication connection to the management node.

The secondary node is a node that receives the data scheduling information, and receives and sends data or performs data processing based on the received data scheduling information.

Device forms of the management node and the secondary node provided in embodiments of this application may be terminal devices, or may be functional modules or units disposed in the terminal devices, or may be chips, integrated circuits, or the like deployed in the terminal devices.

The terminal device is a device that has a short-range wireless communication function and a UWB communication function. The terminal device may also be referred to as user equipment (UE), a mobile terminal (MT), or the like. The terminal device includes but is not limited to a mobile phone, a tablet computer, a notebook computer, a palmtop computer, a mobile Internet device (MID), a wearable device (for example, a smart watch or a smart band), a vehicle, an in-vehicle device (for example, a car, an electric vehicle, an aircraft, a ship, a train, or a high-speed railway), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot air balloon, an unmanned aerial vehicle, or an aircraft), or the like.

For example, the terminal device in this embodiment of this application includes but is not limited to carrying iOS®, Android®, Microsoft®, or another operating system.

It should be understood that, in embodiments of this application, “at least one” refers to one or more, and “a plurality of” refers to two or more. The term “and/or” describes an association relationship between associated objects, and indicates that three relationships may exist. For example, A and/or B may indicate the following cases: Only A exists, both A and B exist, and only B exists, where A and B may be singular or plural. The character “/” generally indicates an “or” relationship between the associated objects. “At least one of the following” or similar expressions refer to any combination of these items, including any combination of single items or a plurality of items. For example, at least one of a, b, or c may indicate a, b, c, a and b, a and c, b and c, or a, b, and c, where a, b, and c may be singular or plural.

FIG. 1*a* is a schematic architectural diagram of a UWB ranging system. As shown in FIG. 1*a*, the UWB ranging system may include a management node and at least one secondary node (for example, N secondary nodes shown in FIG. 1*a*, where N is a positive integer).

A UWB ranging process may be performed between the management node and any two nodes of the at least one secondary node. The two nodes that perform the UWB ranging process are an initiator and a responder of the UWB ranging process.

As a controller in the UWB ranging system, the management node may control and manage all nodes in the UWB ranging system. For example, the management node may indicate two nodes that perform a ranging process in the UWB ranging system, configure the initiator and the responder in the two nodes, and allocate time periods for the two nodes to perform steps in the UWB ranging process. The at least one secondary node is used as a controlee, and may perform the UWB ranging process with another node based on control of the management node.

Figure 1B:
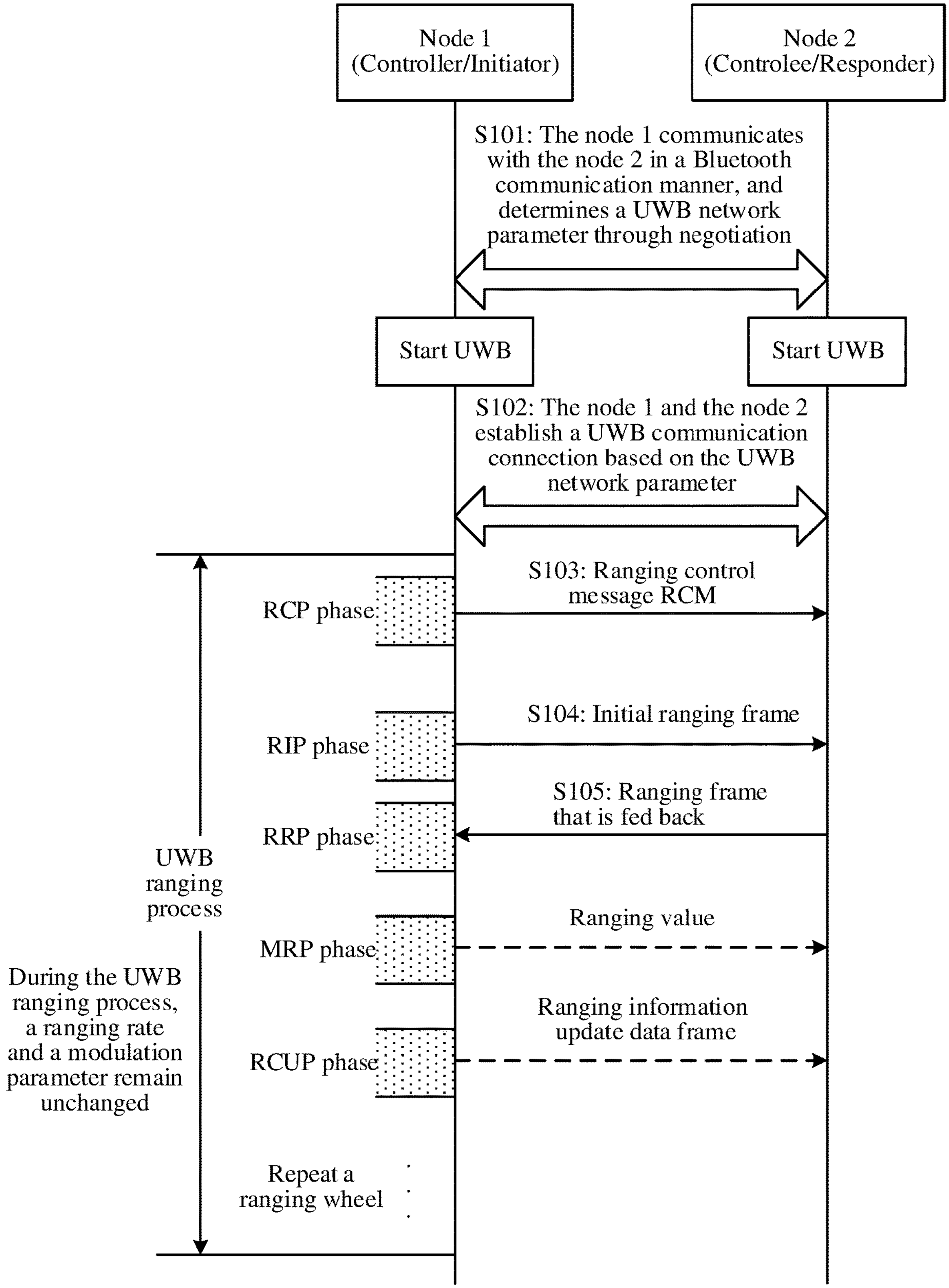
FIG. 1*b* is a schematic diagram of a UWB ranging process.

The following briefly describes UWB ranging with reference to FIG. 1*b*.

It is assumed that a node 1 and a node 2 are two nodes that perform the UWB ranging process. The node 1 is used as both a controller and an initiator, and the node 2 is used as both a controlee and a responder. In this case, the node 1 may be the management node shown in FIG. 1*a*, and the node 2 may be any secondary node shown in FIG. 1*a*.

Refer to FIG. 1*b*, based on a current UWB ranging method, when the node 1 and the node 2 perform the UWB ranging process, the following steps are mainly included:

S101: Anode 1 communicates with a node 2 in a Bluetooth communication manner, and determines a UWB network parameter through negotiation.

S102: The node 1 and the node 2 respectively start a UWB, and establish a UWB communication connection based on the UWB network parameter.

S103: The node 1 sends a ranging control message (ranging control message, RCM) to the node 2 in an RCP phase.

In the UWB ranging, one UWB ranging process may be divided into a plurality of phases (or time periods), where the plurality of phases are respectively a ranging control phase (RCP), a ranging initial phase (RIP), a ranging response phase (RRP), a measurement report phase (RRP), and a ranging control update phase (RCUP).

The node 1 is used as the management node, and may allocate a role of each node, and indicate the role to a corresponding node through the RCM. For example, the node 1 may configure its own role as an initiator of the UWB ranging process, and configure a role of the node 2 as a responder of the UWB ranging process. In this case, the node 1 indicates the role of the node 2 to the node 2 in the RCM. In addition, the node 1 may configure a plurality of phases of the UWB ranging process based on a time division multiple access (TDMA) technology, and indicate the plurality of phases to the node 2 through the RCM. The node 1 and the node 2 respectively perform corresponding ranging steps in each phase of the UWB ranging process based on each phase configured by the node 1.

S104: The node 1 sends an initial ranging frame to the node 2 in the RIP phase.

The node 1, as the initiator of the UWB ranging process, sends the initial ranging frame to the node 2, as the responder, in the RIP phase.

Optionally, the initial ranging frame may carry time information at which the node 1 sends the initial ranging frame.

S105: After receiving the initial ranging frame, the node 2 feeds back a ranging frame to the node 1.

Optionally, the ranging frame fed back by the node 2 may carry time information of the initial ranging frame fed back by the node 2.

After the node 2 feeds back the ranging frame to the node 1, the node 1 and the node 2 may calculate a range between the node 1 and the node 2 based on a flight time of the ranging frame between the node 1 and the node 2. In addition, any node in the node 1 and the node 2 may send, to an opposite end in the MRP phase, a ranging value calculated by the node 1 and the node 2.

As the controller, if the node 1 needs to update a parameter (such as a role of the node and a specific time of each phase) in the RCM, the node 1 may send a ranging information update data frame to the node 2 in the RCUP phase, so as to indicate an updated parameter to the node 2.

As shown in FIG. 1*b*, a multi-round ranging process may be repeatedly performed between the node 1 and the node 2. However, in the multi-round ranging process, ranging rates, modulation parameters, and the like used by the node 1 and the node 2 are fixed. Therefore, flexibility during ranging is poor, and a fixed ranging rate keeps being used for communication, which may cause problems such as poor power consumption and poor ranging performance.

In view of this, embodiments of this application provide a ranging rate switch control method and a communication apparatus. The method is for performing switch control of a ranging rate used by a node that performs ranging in a ranging process, so as to improve flexibility of ranging control and ranging performance.

The following describes the solutions provided in this application with reference to specific embodiments.

Figure 2A:
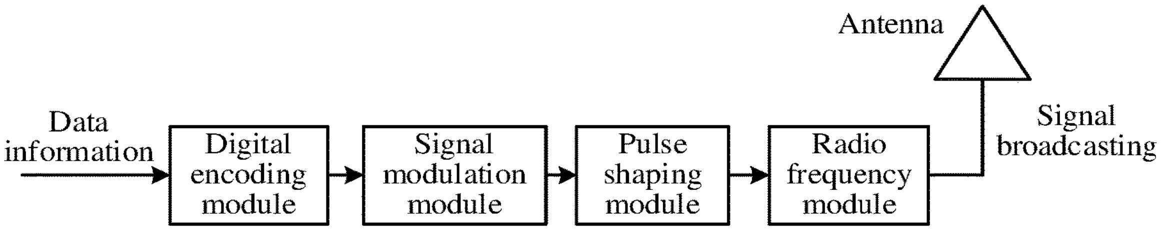
FIG. 2*a* is a schematic diagram of a UWB signal transmitting system in a node according to an embodiment of this application.

FIG. 2*a* is a schematic diagram of a UWB signal transmitting system in a node according to an embodiment of this application. As shown in FIG. 2*a*, the UWB signal transmitting system of the node may include a digital encoding module, a signal modulation module, a pulse shaping module, a radio frequency module, an antenna, and the like.

In a process in which the node performs a UWB ranging procedure, the digital encoding module may determine a signal encoding rate based on the ranging rate, perform digital encoding on to-be-sent data information based on a determined signal encoding rate, and send data bit information obtained through encoding to the signal modulation module. The signal modulation module may perform signal modulation on the data bit information, and then transmit modulated data bit information to the pulse shaping module. The pulse shaping module may perform pulse shaping on the modulated data bit information to obtain a corresponding pulse signal, and send the pulse signal to the radio frequency module. The pulse signal is converted into an analog signal by the radio frequency module, and is broadcast by the antenna.

Figure 2B:
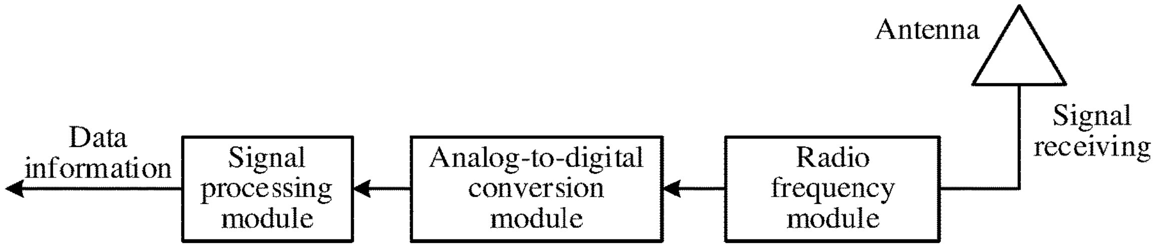
FIG. 2*b* is a schematic diagram of a UWB signal receiving system in a node according to an embodiment of this application.

FIG. 2*b* is a schematic diagram of a UWB signal receiving system in a node according to an embodiment of this application. As shown in FIG. 2*b*, the UWB signal receiving system of the node may include an antenna, a radio frequency module, an analog-to-digital conversion module, a signal processing module, and the like.

In a process in which the node performs a ranging procedure, the node may receive a signal from another node through the antenna. The radio frequency module may perform processing such as frequency mixing on a signal received by the antenna. The analog-to-digital conversion module may perform analog-to-digital conversion on a signal processed by the radio frequency module, to obtain a corresponding digital signal. The signal processing module may perform corresponding digital signal processing on a digital signal obtained by the analog-to-digital conversion module, to obtain corresponding data information. The digital signal processing performed by the signal processing module on the digital signal may include processing processes such as signal capture, signal tracking, signal demodulation, and signal decoding.

It should be noted that the signal transmitting system shown in FIG. 2*a* and the signal receiving system shown in FIG. 2*b* may exist in a same node, and are respectively configured to implement signal transmitting and signal receiving functions of the node. The node may be a first node or a second node provided in embodiments of this application. The first node and the second node provided in embodiments of this application may be respectively the management node and any secondary node in a system architecture shown in FIG. 1*a*, or may be respectively any two secondary nodes in a system architecture shown in FIG. 1*a*.

Figure 3:
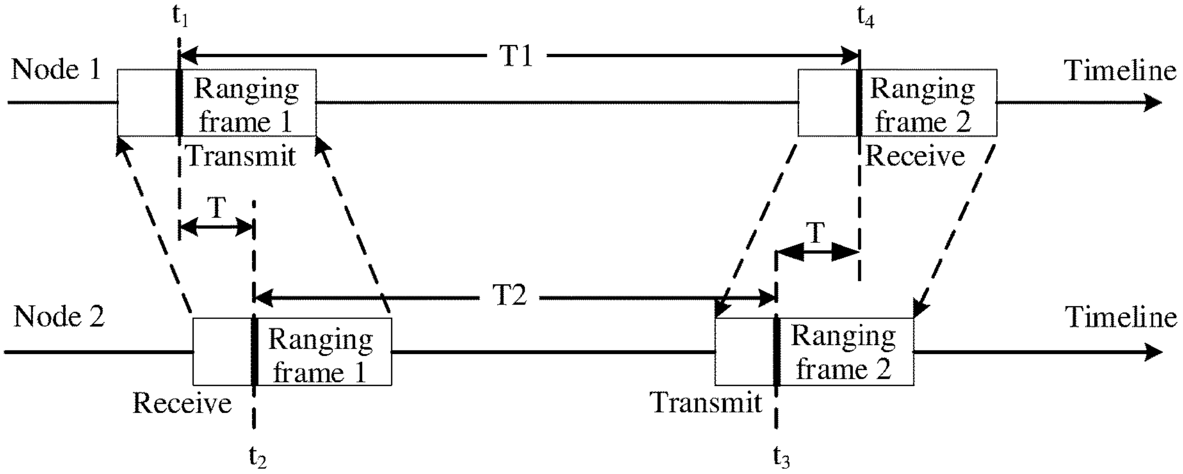
FIG. 3 is a schematic diagram of a UWB ranging method according to an embodiment of this application.

FIG. 3 is a schematic diagram of a UWB ranging method according to an embodiment of this application. As shown in FIG. 3, it is assumed that a node 1 is an initiator of a UWB ranging process, and a node 2 is a responder of the UWB ranging process. In this case, in the UWB ranging process, the node 1 sends a ranging frame 1 to the node 2 at a moment $t_1$, the node 2 receives the ranging frame 1 at a moment $t_2$, and returns a ranging frame 2 to the node 1 at a moment $t_3$, and the node 1 receives the ranging frame 2 at a moment $t_4$.

Therefore, an average transmission time of the ranging frames transmitted between the node 1 and the node 2, that is, a signal flight time, may be calculated according to the following formula:

$$T=(T_1-T_2)/2$$

T is the signal flight time, $T_1$ is a time interval between sending the ranging frame 1 by the node 1 and receiving the ranging frame 2 by the node 1, $T_1=t_4-t_1$, $T_2$ is a time interval between receiving the ranging frame 1 by the node 2 and sending the ranging frame 2, and $T_2-t_3-t_2$.

The node 1 or the node 2 further multiplies the flight time of the signal by a propagation speed of an electromagnetic wave (that is, the speed of light) to obtain the range between the node 1 and the node 2.

Figure 4:
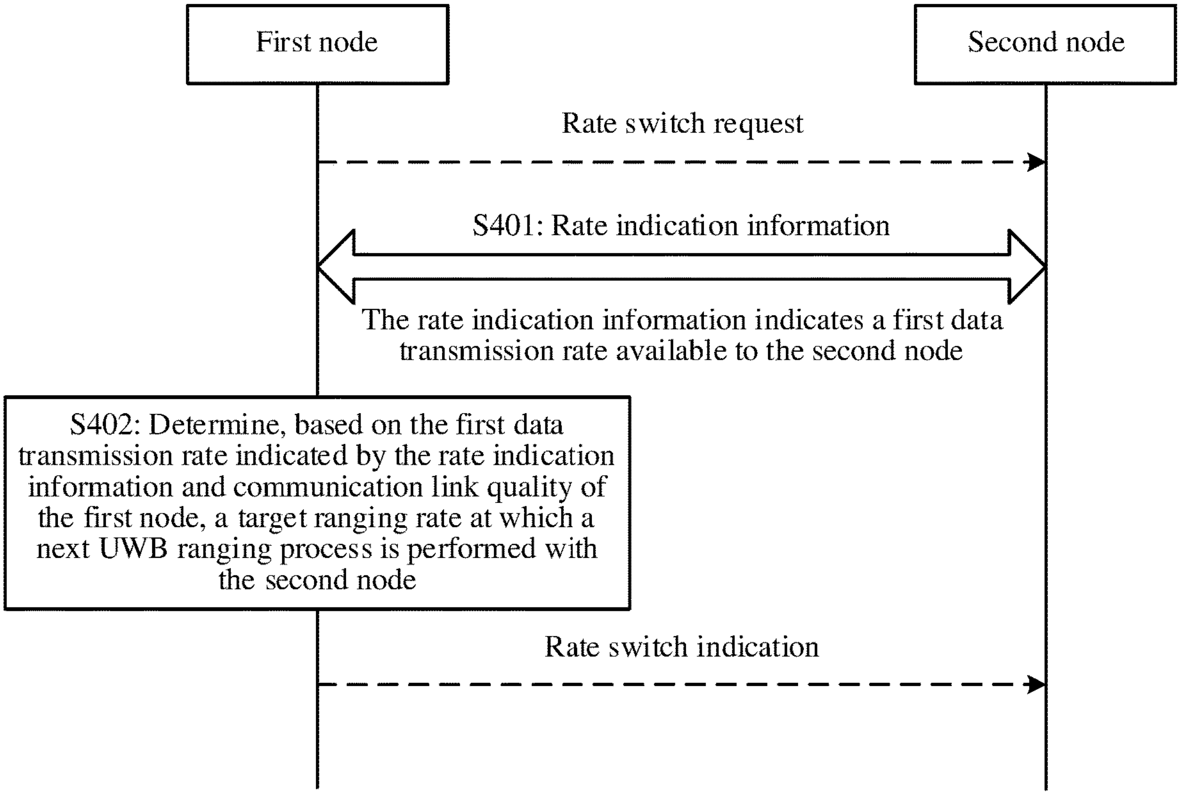
FIG. 4 is a schematic diagram of a ranging rate switch control method according to an embodiment of this application.

FIG. 4 is a schematic diagram of a ranging rate switch control method according to an embodiment of this application. As shown in FIG. 4, the method includes the following steps:

S401. When a first node and a second node perform a current UWB ranging process, the second node sends rate indication information to the first node, and the first node receives the rate indication information from the second node, where the rate indication information indicates a first data transmission rate available to the second node.

In embodiments of this application, when the first node and the second node perform the UWB ranging process, the first node and the second node first need to establish a communication connection in a short-range wireless communication manner, and then the first node and the second node may determine a UWB network parameter through negotiation based on the short-range wireless communication, and then establish a UWB communication connection based on a UWB parameter determined through negotiation. After establishing the UWB communication connection, the first node and the second node may perform the UWB ranging process based on a UWB communication manner.

The foregoing short-range wireless communication manner includes but is not limited to Bluetooth communication, Bluetooth low energy (BLE) communication, Wi-Fi communication, NFC communication, and the like. The foregoing UWB network parameter may include, for example, a channel number (channel number), a preamble code, a ranging rate, and the like.

In embodiments of this application, the first node may be used as a ranging initiator, and the second node may be used as a ranging responder. As the ranging initiator, the first node may initiate a procedure of switching a ranging rate used when the first node and the second node perform the UWB ranging process.

Specifically, before the second node sends the rate indication information to the first node, and the first node receives the rate indication information from the second node, the first node may first send a rate switch request to the second node. The rate switch request requests the second node to feed back the rate indication information. Then, the second node sends the rate indication information to the first node in response to the rate switch request, and the first node receives the rate indication information from the second node.

In a possible manner, when sending the rate switch request to the second node, the first node may send the rate switch request to the second node by sending a first ranging frame that carries the rate switch request to the second node. The second node determines the rate switch request by receiving the first ranging frame that carries the rate switch request. The first ranging frame indicates the second node to feed back a second ranging frame. After receiving the first ranging frame that carries the rate switch request, when feeding back the rate indication information to the first node, the second node may send the rate indication information to the first node by sending the second ranging frame that carries the rate indication information to the first node. The first node determines the rate indication information by receiving the second ranging frame that is from the second node and that carries the rate indication information.

The first ranging frame may be used as a ranging request frame, and the second ranging frame may be used as a ranging response frame. The first node and the second node may calculate the range between the first node and the second node by receiving and sending the first ranging frame and the second ranging frame. For example, the first ranging frame may be the ranging frame 1 shown in FIG. 3, and the second ranging frame may be the ranging frame 2 shown in FIG. 3.

In another possible manner, the first node respectively sends the first ranging frame and the rate switch request to the second node at the same time, and the second node receives the first ranging frame and the rate switch request from the first node at the same time. The second node may respectively send the second ranging frame and the rate indication information to the first node at the same time, and the first node receives the second ranging frame and the rate indication information from the second node at the same time.

In still another possible manner, the first node may directly send the rate switch request to the second node, and the second node directly receives the rate switch request from the first node. The second node may directly send the rate indication information to the first node, and the first node directly receives the rate indication information from the second node.

In some embodiments of this application, after receiving the rate switch request from the first node, the second node may determine communication link quality of the second node by performing communication link quality evaluation, and determine a first link quality parameter corresponding to the communication link quality of the second node. Then, a data transmission rate corresponding to the first link quality parameter is selected from a plurality of candidate data transmission rates as the first data transmission rate available to the second node. Different data transmission rates correspond to different link quality parameters.

During specific implementation, the first node and the second node may pre-store correspondences between the plurality of candidate data transmission rates and a plurality of link quality parameters. The correspondence may be preset, and is indicated by a management node to at least one secondary node. The management node and the at least one secondary node include at least the first node and the second node.

In the correspondence between the data transmission rate and the link quality parameter, the plurality of data transmission rates are different, and different data transmission rates respectively correspond to different link quality parameters. For example, a specific value of the link quality parameter may be a value interval of the communication link quality.

A possible correspondence between a candidate data transmission rate and a link quality parameter in embodiments of this application is shown in Table 1.

TABLE 1

A correspondence table between a data transmission rate and a link quality parameter

| Link quality parameters | Data transmission rates |
| --- | --- |
| First interval | First rate |
| Second interval | Second rate |
| . . . | . . . |
| $n^{th}$ interval | $n^{th}$ rate |

For example, as shown in Table 1, the first rate to the $n^{th}$ rate are respectively values of n different candidate data transmission rates, where n is a positive integer. The first interval to the $n^{th}$ interval are respectively value intervals of communication link quality that are in a one-to-one correspondence with the first rate to the $n^{th}$ rate. A rate corresponding to an interval to which a value of the communication link quality of the node belongs is a data transmission rate available to the node.

After receiving the rate switch request from the first node, the second node may determine communication quality of a communication link of the second node by performing communication link quality evaluation, and then select, from the plurality of candidate data transmission rates based on a first link quality parameter corresponding to the communication quality, a data transmission rate corresponding to the first link quality parameter as the first data transmission rate available to the second node.

For example, when a value of the communication link quality determined by the second node is in the second interval shown in Table 1, the second node may determine that the first link quality parameter is the second interval. Therefore, the second node may determine that the first data transmission rate available to the second node is the second rate corresponding to the second interval.

Because the first node and the second node pre-store a same correspondence table between a data transmission rate and a link quality parameter, after the second node feeds back at least one of the first data transmission rate available to the second node and the first link quality parameter corresponding to the first data transmission rate to the first node, the first node can determine the first data transmission rate available to the second node. Therefore, the rate indication information sent by the second node to the first node may include first information indicating the first data transmission rate, and/or second information indicating the first link quality parameter corresponding to the first data transmission rate.

Specifically, in a possible manner, the first information is the first data transmission rate. In this case, the second node carries the first data transmission rate in the rate indication information, so that the first node can directly obtain the first data transmission rate after receiving the rate indication information.

In another possible manner, the first information is a position of the first data transmission rate in a correspondence table between a candidate data transmission rate and a link quality parameter, for example, a position index of the first data transmission rate in the correspondence table. In this case, the second node may carry the position index of the first data transmission rate in the correspondence table in the rate indication information. After receiving the rate indication information, the first node may search in the correspondence table, based on the position index in the rate indication information, to determine the first data transmission rate at a corresponding position.

In a possible manner, the second information is the first link quality parameter. In this case, the second node may carry the first link quality parameter in the rate indication information. After receiving the rate indication information, the first node may search in the correspondence table, based on the first link quality parameter in the rate indication information, to determine the first data transmission rate corresponding to the first link quality parameter. In another possible manner, the second information is a position of the first link quality parameter in a correspondence table between a candidate data transmission rate and a link quality parameter, for example, a position index of the first link quality parameter in the correspondence table. In this case, the second node may carry the position index of the first link quality parameter in the correspondence table in the rate indication information. After receiving the rate indication information, the first node may search the correspondence table for the first link quality parameter at the corresponding position based on the position index in the rate indication information, and further determine the first data transmission rate corresponding to the first link quality parameter.

In the foregoing manner, the second node may indicate the first data transmission rate available to the second node to the first node through the rate indication information, and the first node may determine, based on the rate indication information from the second node, the first data transmission rate available to the second node.

S402: The first node determines, based on the first data transmission rate indicated by the rate indication information and communication link quality of the first node, a target ranging rate at which a next UWB ranging process is performed with the second node.

In embodiments of this application, after receiving the rate indication information from the second node, the first node may determine communication link quality of the first node by performing communication link quality evaluation, and then determine, based on the communication link quality of the first node, a second link quality parameter corresponding to a correspondence table of a candidate data transmission rate and a link quality parameter and a second data transmission rate corresponding to the second link quality parameter. The second link quality parameter may be a value interval to which the communication link quality of the first node belongs. The second data transmission rate is a data transmission rate corresponding to the second link quality parameter in the plurality of candidate data transmission rates in the correspondence table.

After determining the available second data transmission rate, the first node may determine, based on the first data transmission rate and the second data transmission rate, the target ranging rate at which the next UWB ranging process is performed with the second node.

Specifically, the first node may determine whether the first data transmission rate is the same as the second data transmission rate and is different from a data transmission rate used in performing the current UWB ranging process. When the first data transmission rate is the same as the second data transmission rate and is different from a data transmission rate used in performing the current UWB ranging process, the first node uses the first data transmission rate as the target ranging rate; or when the first data transmission rate is different from the second data transmission rate or the first data transmission rate is the same as a data transmission rate used in performing the current UWB ranging process, the first node uses the data transmission rate used in performing the current UWB ranging process as the target ranging rate.

In the UWB ranging, if there is no special indication, two nodes that perform the ranging process perform each UWB ranging process by default based on a ranging rate determined initially. Therefore, when the first node uses the data transmission rate used in performing the current UWB ranging process as the target ranging rate, because the ranging rate does not change, the first node does not need to indicate the target ranging rate to the second node. The first node and the second node deliberately use, based on a default method, the data transmission rate used in the current UWB ranging process as the ranging rate when the next UWB ranging procedure is performed. Certainly, the first node may also indicate the second node not to switch the ranging rate, or indicate the data transmission rate used in the current UWB ranging process as the target ranging rate to the second node.

When the first node uses the first data transmission rate as the target ranging rate, the first node needs to indicate the second node to switch the ranging rate. Specifically, the first node may send a rate switch indication to the second node, where the rate switch indication indicates the second node to switch a ranging rate of the second node to the target ranging rate when the next UWB ranging process is performed. Then, when performing the next UWB ranging process, the first node switches a ranging rate of the first node to the target ranging rate. After receiving the rate switch indication, the second node also switches a ranging rate of the second node to the target ranging rate when the next UWB ranging process is performed.

In a possible case, when the first node is a management node and the second node is a secondary node, or when the first node and the second node are two different secondary nodes, the first node may directly send the rate switch indication to the second node. For example, after receiving a second data frame from the second node, the first node may calculate a ranging value between the first node and the second node, and the first node may send the rate switch indication together with the ranging value to the second node when the ranging value is notified to a second device.

In another possible case, when the first node and the second node are two different secondary nodes, the first node may send the rate switch indication to the second node through forwarding by the management node.

For example, when the first node and the second node perform the current UWB ranging process, the first node may send the rate switch indication to the management node, to request the management node to control the first node and the second node to switch the ranging rate. After receiving the rate switch indication from the first node, the management node may send the rate switch indication to the second node, and send the rate switch indication to the first node at the same time, so as to indicate the first node and the second node to switch the ranging rate to the target ranging rate when the next UWB ranging process is performed. After receiving the rate switch indication from the management node, the first node and the second node respectively switch the ranging rate used by the first node and the second node to the target ranging rate when the next UWB ranging process is performed.

Optionally, the rate switch indication carries the target ranging rate.

In embodiments of this application, when performing a next ranging process, the first node and the second node switch the ranging rate to the target ranging rate. A specific implementation is as follows: When performing the next ranging process, the first node and the second node use the target ranging rate as a new data transmission rate, and transmit data by using the new data transmission rate. More specifically, the first node and the second node perform encoding on to-be-sent data information to the opposite end by using an encoding rate corresponding to the target ranging rate.

In the foregoing embodiment, when the first node and the second node perform the current UWB ranging process, the first node may respectively determine, based on the rate indication information from the second node and the communication link quality of the first node, data transmission rates available to the first node and the second node, so as to determine a ranging rate at which the next UWB ranging process is performed by the second node. Based on this solution, the first node and the second node may determine, through negotiation, a ranging rate supported by both parties, and use the ranging rate when performing the next ranging process. Therefore, when performing the UWB ranging process, the first node and the second node can perform flexible switch control of the ranging rate used in the UWB ranging process, so as to select a ranging rate most suitable for a current environment to perform the UWB ranging process, thereby improving ranging performance. In addition, power consumption may be reduced to some extent, execution of the ranging procedure may be accelerated, and ranging performance may be further improved. In addition, because a rate negotiation of rate switch is performed between the first node and the second node that establish UWB communication, the first node and the second node may interact based on a UWB communication manner. Therefore, dependency on another communication system or communication manner may be reduced, a ranging rate switch procedure may be simplified, and switch efficiency may be improved.

The following respectively describes data formats of the rate switch request, the rate indication information, and the rate switch indication in the foregoing embodiments.

1. Rate Switch Request

In embodiments of this application, a rate switch request information element (IE) may include the following fields:

1) Channel quality request field: indicating whether channel quality evaluation (that is, communication link quality evaluation) needs to be performed.

2) Channel quality list field: indicating a plurality of nodes. The field includes addresses of the plurality of nodes.

3) Address size descriptor field: indicating a size type of an address of a target node. The target node is a node that needs to respond to the rate switch request and that is in the nodes that receive the rate switch request, and the target node may be determined by a transmit end of the rate switch request. A size type of the address may be classified into a long address and a short address. For example, an address with a size of 2 bytes is the short address, and an address with a size of 8 bytes is the long address.

4) Channel quality list number field: indicating a quantity of nodes that need to respond to the rate switch request in the plurality of nodes indicated by the channel quality list field.

For example, a possible format of the rate switch request IE is shown in the following Table 2:

TABLE 2

| Rate switch request IE | | | | |
|---|---|---|---|---|
| A quantity of bits | 0 | 1-2 | 3-6 | Variable (variable) |
| Fields | Channel quality request | Address size specifier | Channel quality list number | Channel quality list |

As shown in Table 2, in the rate switch request IE, bit 0 is the channel quality request field, and a value of the field may be 0 or 1. For example, when a value of the channel quality request field is 1, the channel quality request field may indicate that communication link quality evaluation needs to be performed, and when a value of the channel quality request field is 0, the channel quality request field may indicate that the communication link quality evaluation does not need to be performed.

Bits 1 to 2 are the address size specifier field. For example, when a value of the address size specifier field is 1, the address size specifier field may indicate that an address of a target node is a long address, and when a value of the address size specifier field is 0, the address size specifier field may indicate that the address of the target node is a short address. It should be understood that the address size specifier field may also have another value indicating another size type. Details are not described herein again.

Bits 3 to 6 are the channel quality list number field.

A bit length of the channel quality list field is variable, and may specifically change based on a quantity of a plurality of nodes indicated by the channel quality list field and an address size.

A format of an address of any node in the channel quality list is shown in the following Table 3:

TABLE 3

| Node addresses in a channel quality list field |
|---|
| Bytes (Octets): 2/8<br>Node addresses |

For example, as shown in Table 3, an address of any node in the channel quality list may be a 2-byte short address or an 8-byte long address.

It should be understood that a bit length and a bit position of each field in the rate switch request IE shown in Table 2 are merely used as an example, and do not impose a limitation on the bit length and the bit position of each field in the rate switch request IE.

2. Rate Indication Information

In embodiments of this application, a rate indication information IE includes at least one of the following fields:

1) Quality level field: indicating a link quality parameter corresponding to communication link quality of a node in the foregoing correspondence between a plurality of candidate data transmission rates and link quality parameters, where the link quality parameter is a value interval to which the communication link quality belongs.
2) Estimated rate level field: indicating a data transmission rate corresponding to the link quality parameter in the quality level field in the correspondence between the plurality of candidate data transmission rates and the link quality parameters.

In some embodiments of this application, the rate indication information IE may further include a reserved field. The reserved field may indicate some other related information. This is not specifically limited herein.

For example, a possible format of the rate indication information IE is shown in Table 4:

TABLE 4

| Rate indication information IE | | | |
|---|---|---|---|
| A quantity of bits | 0-3 | 4-6 | 7 |
| Fields | Quality level | Estimated rate level | Reserved |

As shown in Table 4, a data length of the rate indication information may be 8 bits, and a quantity of bits is 0 to 7. In the bits, bits 0 to 3 may carry the quality level field. For example, a value of the quality level field may be a determined link quality parameter selected by the node in the foregoing Table 1, or may be a position index value, in Table 1, of a determined link quality parameter selected by the node in the foregoing Table 1.

Bits 4 to 6 may carry the estimated rate level field. For example, a value of the estimated rate level field may be a determined data transmission rate selected by the node in the foregoing Table 1, or may be a position index value, in Table 1, of a determined data transmission rate selected by the node in the foregoing Table 1.

The seventh bit may carry a reserved field.

It should be understood that a bit length and a bit position of each field in the rate indication information IE shown in Table 4 are merely used as an example, and do not impose any limitation on the bit length and the bit position of each field in the rate indication information IE.

3. Rate Switch Indication

In embodiments of this application, a rate switch indication IE may include the following fields:

1) Switch indication field: indicating a switch ranging rate.
2) Switch rate index field: indicating a switched ranging rate.
3) Rate switch list field: indicating a plurality of nodes. The field includes addresses of the plurality of nodes.
4) Address size specifier field: indicating an address size of a target node, where the target node is a node that is in the nodes that receive the rate switch indication and that needs to respond to the rate switch indication, and the target node may be determined by a transmit end of the rate switch indication. A size type of the address may be classified into a long address or a short address.
5) Rate switch list number field: indicating a quantity of nodes that need to respond to the rate switch indication in the plurality of nodes indicated by the rate switch list field.

For example, a possible format of the rate switch indication IE is shown in the following Table 5:

TABLE 5

| Rate switch indication IE | | | | | |
|---|---|---|---|---|---|
| A quantity of bits | 0 | 1-4 | 5-6 | 7-10 | Variable |
| Fields | Switch indication | Switch rate index | Address size specifier | Rate switch list number | Rate switch list |

As shown in Table 5, in the rate switch indication IE, bit 0 is the switch indication field, and a value of the field may be 0 or 1. For example, when a value of the switch indication field is 1, the switch indication field may indicate that a ranging rate needs to be switched; and when the value of the switch indication field is 0, the switch indication field may indicate that the ranging rate does not need to be switched.

Bits 1 to 4 are the switch rate index field. For example, a value of the switch rate index field may be a position index, in Table 1, of a data transmission rate corresponding to the communication link quality of the node in the correspondence shown in Table 1.

Bits 5 to 6 may carry the address size specifier field. For example, when a value of the address size specifier field is 1, the address size specifier field may indicate that an address of a target node is a long address, and when the value of the address size specifier field is 0, the address size specifier field may indicate that the address of the target node is a short address. It should be understood that the address size specifier field may also have another value indicating another size type. Details are not described herein again.

Bits 7 to 10 are the rate switch list number field.

A bit length of the rate switch list field is variable, and may specifically change based on a quantity of a plurality of nodes indicated by the rate switch list field and an address size.

A format of an address of a node in the rate switch list is shown in the following Table 6:

TABLE 6

| Rate switch list field |
|---|
| Bytes (Octets): 2/8<br>Node addresses |

As shown in Table 6, an address of a node in the rate switch list may be a 2-byte short address or an 8-byte long address.

It should be understood that a bit length and a bit position of each field in the rate switch indication IE shown in Table 5 are merely used as an example, and do not impose a limitation on the bit length and the bit position of each field in the rate switch indication IE.

The ranging rate switch control method provided in embodiments of this application may be used in a one-to-one ranging scenario (for example, the foregoing ranging between the first node and the second node), and may be further used in a one-to-many ranging scenario.

For example, this solution may be applied to a scenario in which the first node performs ranging with a plurality of other nodes.

In a possible solution, the second node may be each node in the plurality of nodes, and the first node may respectively perform the solution provided in the foregoing embodiment with each node in the plurality of nodes, so as to implement ranging rate switch control between the first node and each node. For a specific embodiment of this solution, refer to the description in the foregoing embodiment. Details are not described herein again. In this solution, the first node may respectively perform the UWB ranging process with each node in the plurality of nodes by using different ranging rates, and may respectively negotiate with each node to perform ranging rate switch. Therefore, for ranging rate switch control, this solution has strong flexibility.

In another possible solution, the first node may determine a common ranging rate based on data transmission rates available to the plurality of nodes and the data transmission rate available to the first node, and may respectively perform the UWB ranging process with the plurality of nodes by using the ranging rate. In this solution, the first node performs the UWB ranging process with each node in the plurality of nodes by using a same ranging rate. In this way, a time consumed for negotiating the ranging rate may be reduced, and ranging rate switch may be quickly implemented.

The following respectively describes the solution provided in embodiments of this application with reference to the one-to-one ranging scenario and the one-to-many ranging scenario.

Example 1: One-to-One Ranging Scenario

In this example, the ranging rate switch control method provided in embodiments of this application is described based on the method for performing the UWB ranging process by the node 1 and the node 2 shown in FIG. 1*b* and the method provided in the foregoing embodiment. The first node is used as a controller and an initiator, and the second node is used as a controlee and a responder.

Figure 5:
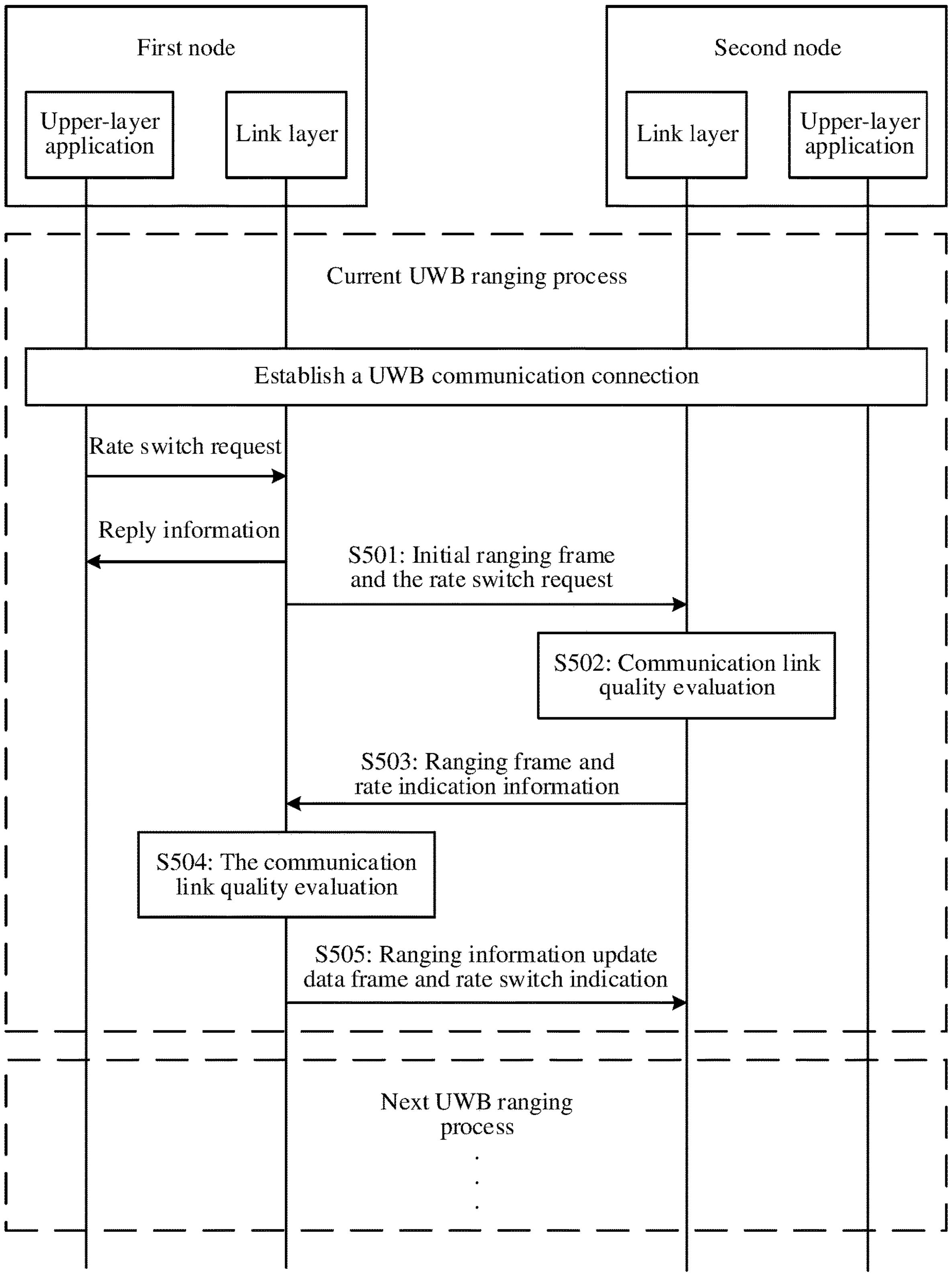
FIG. 5 is a schematic diagram of a ranging rate switch control method according to an embodiment of this application.

Refer to FIG. 5, a ranging rate switch control method provided in embodiments of this application includes the following steps:

S501: A first node sends an initial ranging frame and a rate switch request to a second node.

In this example, before step S501, the first node and the second node may first establish a UWB communication connection with reference to the manner of steps S101 to S103 in FIG. 1*b*, and configure a node role, each phase in a ranging process, and the like.

As shown in FIG. 5, both the first node and the second node may include an upper-layer application (on a host side) and a link layer. The upper-layer application may control the first node, and the link layer is configured to provide a data transmission service for the first node. When the first node determines to switch a ranging rate in a current ranging process with the second node, the upper-layer application of the first node may send the rate switch request to the link layer. After the link layer replies with acknowledgment information, the link layer sends the initial ranging frame and the rate switch request to the second node through the antenna.

When step S501 is performed, the first node may send the initial ranging frame (that is, the initial ranging frame) and the rate switch request to the second node in the RIP phase.

For example, the rate switch request IE may be in the format shown in Table 2. After receiving the rate switch request, the second node may sequentially determine, in first K addresses included in the channel quality list field, whether an address that meets a size type indicated by the address size specifier field is an address of the second node based on an address sequence. K is a quantity value indicated by the channel quality list number. When it is determined that an address is the address of the second node, the second node may perform communication link quality evaluation based on an indication of the channel quality request field, to determine communication link quality of the second node.

For example, it is assumed that in Table 2, the channel quality request field indicates that communication link quality evaluation is performed, the address size specifier field indicates a long address, the channel quality list number field indicates 10, and the channel quality list field includes addresses of 30 nodes. The address of the second node is an eighth address among the 30 addresses included in the channel quality list field, and is a long address. After receiving the rate indication information, the second node sequentially determines, based on indications of the address size specifier field and the channel quality list number field, long addresses in first 10 addresses among the 30 addresses included in the channel quality list field, and determines whether each long address is the address of the second node. The second node may determine, by determining the second node, that the address of the second node is the long address included in the first 10 addresses in the channel quality list field. Therefore, the second node may determine to respond to the indication of the channel quality request field to perform communication link quality evaluation.

S502. After receiving the rate switch request from the first node, the second node performs communication link quality evaluation.

For example, when determining, based on the rate switch request from the first node, to perform communication link quality evaluation, the second node determines the communication link quality of the second node by performing communication link quality evaluation. Then, the second node determines a link quality parameter to which the communication link quality of the second node belongs in Table 1, and further determines a data transmission rate corresponding to the link quality parameter as a first data transmission rate available to the second node.

S503. The second node feeds back a ranging frame and rate indication information to the first node.

After determining the available data transmission rate, the second node may feed back the ranging frame and the rate indication information to the first node in the RRP phase. For example, the rate indication information IE may be in the format shown in Table 4. A value of the quality level field is a position index value, in Table 2, of the link quality parameter corresponding to the communication link quality determined by the second node through evaluation. The estimated rate level field is a position index value, in Table 2, of the data transmission rate that is determined by the second node and that is available to the second node.

S504. After receiving the rate indication information from the second node, the first node performs communication link quality evaluation.

For example, after receiving the rate indication information from the second node, the first node also performs communication link quality evaluation to determine the communication link quality of the first node, and determines, based on Table 1, a link quality parameter corresponding to the communication link quality of the first node and a second data transmission rate available to the first node.

Then, the first node may respectively compare a determined link quality parameter and the second data transmission rate of the first node with the link quality parameter and the first data transmission rate of the second node that are sent by the second node. If both are consistent and are different from a currently used ranging rate, the first node determines to switch the ranging rate; otherwise, the first node determines not to switch the ranging rate.

S505. The first node sends a ranging information update data frame and a rate switch indication to the second node.

In this step, when determining to switch the ranging rate, the first node may send the ranging information update data frame and the rate switch indication to the second node in the RCUP phase.

For example, the rate switch indication IE may be in the format shown in Table 5. After receiving the rate switch indication, the second node may search the rate switch list field for an address of the second node that meets requirements of the address size specifier field and the rate switch list number field. If the address of the second node meets requirements of the address size specifier field and the rate switch list number field, the second node needs to switch the ranging rate based on an indication of the switch indication field. If the address of the second node does not meet requirements of the address size specifier field and the rate switch list number field, the second node does not need to respond to the rate switch indication.

When the first node and the second node perform a subsequent UWB ranging process, the foregoing steps may be repeatedly and dynamically performed, to implement flexible switch of the ranging rate.

In this example, the first node and the second node can determine, by exchanging information related to rate switch in the UWB ranging process, performing communication link quality evaluation of the ranging frame, and with reference to a correspondence between the data transmission rate and the link quality parameter, a ranging rate that is most suitable for a current environment of the first node and the second node, to perform communication and ranging. Therefore, for a network status change in different environments, an optimal ranging rate may be selected in a targeted manner, so as to reduce a probability of data retransmission and an error packet, further reduce power consumption to some extent, accelerate execution of a ranging process, and improve ranging performance. In addition, after establishing the UWB communication connection, the first node and the second node complete switch negotiation of the ranging rate based on UWB communication. Therefore, dependency on another communication system may be reduced, a ranging rate switch procedure may be simplified, and ranging rate switch efficiency may be improved.

Example 2: One-to-Many Ranging Scenario

In this example, based on the method for performing the UWB ranging process by the node 1 and the node 2 shown in FIG. 1*b* and the method provided in the foregoing embodiment, the solution provided in embodiments of this application is described by using an example in which the first node performs ranging with a plurality of nodes. For example, the plurality of nodes include a second node, a third node, and a fourth node. The first node is used as a controller and an initiator, and the second node, the third node, and the fourth node are used as a controlee and a responder. The first node may respectively perform the UWB ranging process shown in FIG. 1*b* with the second node, the third node, and the fourth node. The first node may respectively configure, for the second node, the third node, and the fourth node, each phase in the UWB ranging process performed with each node. The second node, the third node, and the fourth node respectively perform a corresponding ranging step with the first node based on each phase configured by the first node.

Figure 6:
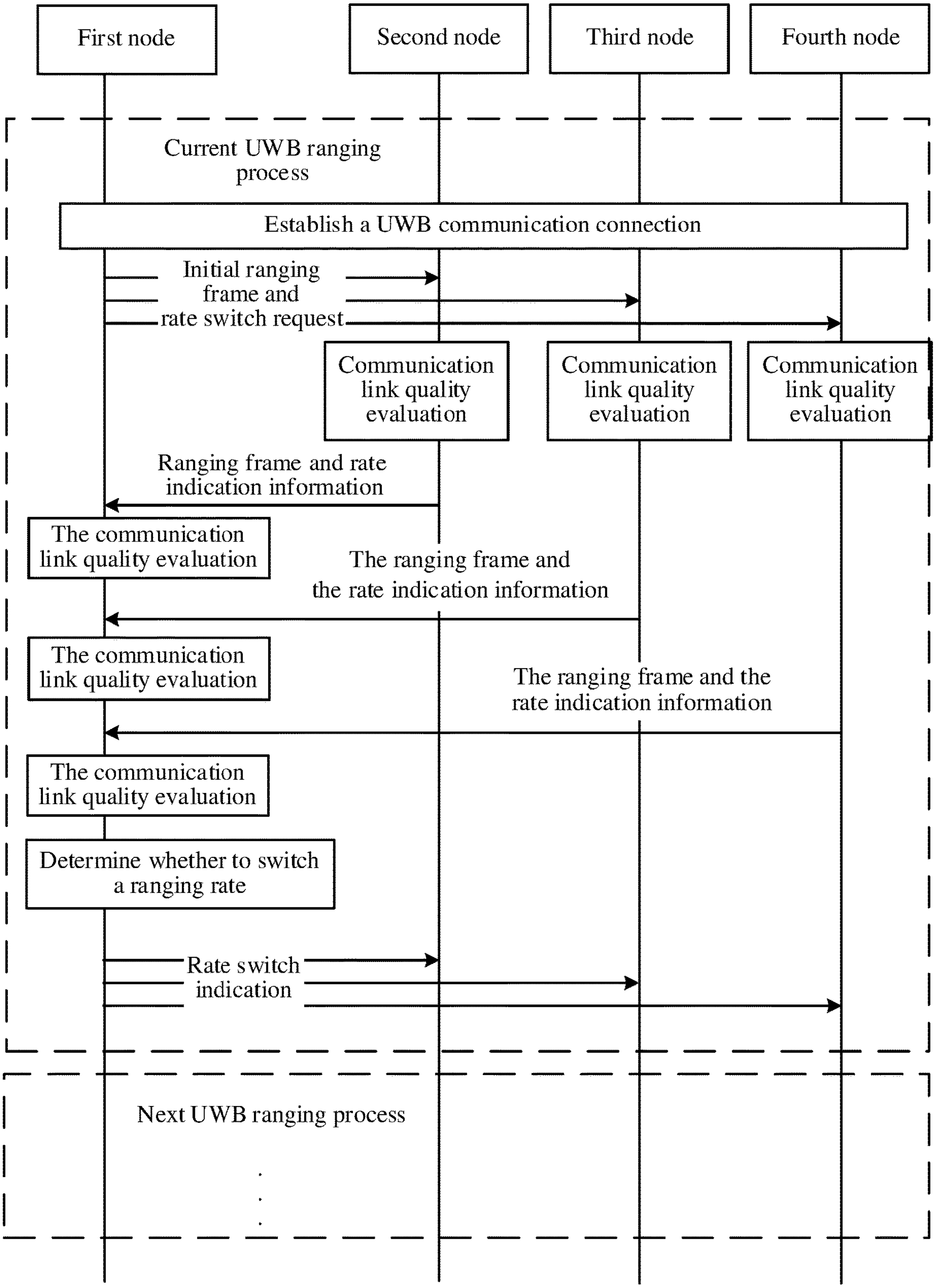
FIG. 6 is a schematic diagram of a ranging rate switch control method according to an embodiment of this application.

Refer to FIG. 6, a ranging rate switch control method provided in embodiments of this application includes the following steps:

1) The first node respectively sends an initial ranging frame and a rate switch request to the second node, the third node, and the fourth node.

For example, the first node may be the management node in the UWB system shown in FIG. 1*a*, and the second node, the third node, and the fourth node may be the secondary nodes shown in FIG. 1*a*.

In a possible manner, after the first node respectively establishes UWB communication connections to the second node, the third node, and the fourth node, for the second node, the third node, and the fourth node, phases that are configured by the first node and that are in a UWB ranging process performed by the nodes may be the same or different.

When the phase configured by the first node is the same as the phase in which each node performs the UWB ranging process, the first node may send the initial ranging frame and the rate switch request to the second node, the third node, and the fourth node at the same time in a same RIP phase in a broadcast manner.

When the phase configured by the first node is different from the phase in which each node performs the UWB ranging process, the first node may respectively send the initial ranging frame and the rate switch request to the second node, the third node, and the fourth node in the RIP phases corresponding to the second node, the third node, and the fourth node.

2) After receiving the initial ranging frame and the rate switch indication from the first node, the second node, the third node, and the fourth node respectively perform communication link quality evaluation to determine an available data transmission rate.

For a specific implementation, refer to the description in the foregoing embodiment, and details are not described herein again.

3) The second node, the third node, and the fourth node respectively feed back the ranging frame and the rate indication information to the first node.

When the phase configured by the first node is the same as the phase in which each node performs the UWB ranging process, the second node, the third node, and the fourth node respectively feed back the ranging frame and the rate indication information to the first node at different moments in a same RRP phase, and the first node respectively receives, at different moments in the RRP phase, the ranging frame and the rate indication information that are fed back by the second node, the third node, and the fourth node.

When the phase configured by the first node is different from the phase in which each node performs the UWB ranging process, the second node, the third node, and the fourth node respectively feed back the ranging frame and the rate indication information to the first node in the RRP phases corresponding to the second node, the third node, and the fourth node. The first node may respectively receive, in the RRP phases corresponding to the second node, the third node, and the fourth node, the ranging frame and the rate indication information that are fed back by the second node, the third node, and the fourth node.

4) After receiving the ranging frame and the rate indication information that are fed back by the second node, the third node, and the fourth node, the first node determines whether to switch the ranging rate.

After receiving the rate indication information fed back by the second node, the third node, and the fourth node, the first node determines a data transmission rate available to the first node by performing communication link quality evaluation. Then, compare whether the ranging rate switch of each node is valid. Specifically, for each node in the second node, the third node, and the fourth node, the first node respectively compares whether a data transmission rate available to the node is the same as the data transmission rate available to the first node and is different from a currently used ranging rate. If yes, it is considered that ranging rate switch between the node and the first node is effective, that is, ranging rate switch may be performed.

The first node collects statistics on effective ranging rate switch with each node, and determines a proportion of nodes that can switch to a same ranging rate in the nodes. When the proportion is greater than or equal to a specified threshold, the first node may switch the ranging rate to the same ranging rate with each node.

For example, the first node may collect statistics on effective ranging rate switch with each node, to obtain content shown in Table 7:

TABLE 7

Effectiveness statistics table of ranging rate switch between a first node and different nodes

| Nodes that perform ranging rate switch with the first node | Whether the ranging rate switch is valid |
|---|---|
| Second node | Yes |
| Third node | Yes |
| Fourth node | Yes |

As shown in Table 7, the second node, the third node, and the fourth node may all perform ranging rate switch with the first node. It is assumed that after comparing data transmission rates available to the first node and the second node, the first node determines that the first node and the second node can switch to a ranging rate of 850 kilobits per second (Kbps). After comparing data transmission rates available to the first node and the third node, the first node determines that the first node and the third node can switch to the ranging rate of 850 Kbps. After comparing data transmission rates available to the first node and the fourth node, the first node determines that the first node and the fourth node can switch to a ranging rate of 6.8 megabits per second (Mbps). In this case, a proportion of nodes (the second node and the third node) that can switch to a same ranging rate (that is, 850 kbps) in the second node, the third node, and the fourth node is ⅔. If a threshold is set to ½, the first node may indicate, through the rate indication information, the second node, the third node, and the fourth node to switch the ranging rate to 850 Kbps.

5) When determining to switch a ranging rate, the first node sends the rate switch indication to the second node, the third node, and the fourth node.

When the phase configured by the first node is the same as the phase in which each node performs the UWB ranging process, the first node may send the ranging information update data frame and the rate switch indication to the second node, the third node, and the fourth node at the same time in a same RCUP phase in a broadcast manner.

When the phase configured by the first node is different from the phase in which each node performs the UWB ranging process, the first node may respectively send the ranging information update data frame and the rate switch indication to the second node, the third node, and the fourth node in the RCUP phases corresponding to the second node, the third node, and the fourth node.

In this example, the first node and the plurality of nodes determine, by exchanging information related to rate switch in the UWB ranging process, performing communication link quality evaluation of the ranging frame, and with reference to a correspondence between the data transmission rate and the link quality parameter, a ranging rate that is most suitable for a current environment of the first node and each node. Therefore, for a network status change in different environments, an optimal ranging rate may be selected in a targeted manner, so as to reduce a probability of data retransmission and an error packet, further reduce power consumption to some extent, accelerate execution of a ranging process, and improve ranging performance. In addition, after the UWB communication connection is established, the first node and each node complete switch negotiation of the ranging rate based on UWB communication. Therefore, dependency on another communication system may be reduced, a ranging rate switch procedure may be simplified, and ranging rate switch efficiency may be improved.

Figure 7:
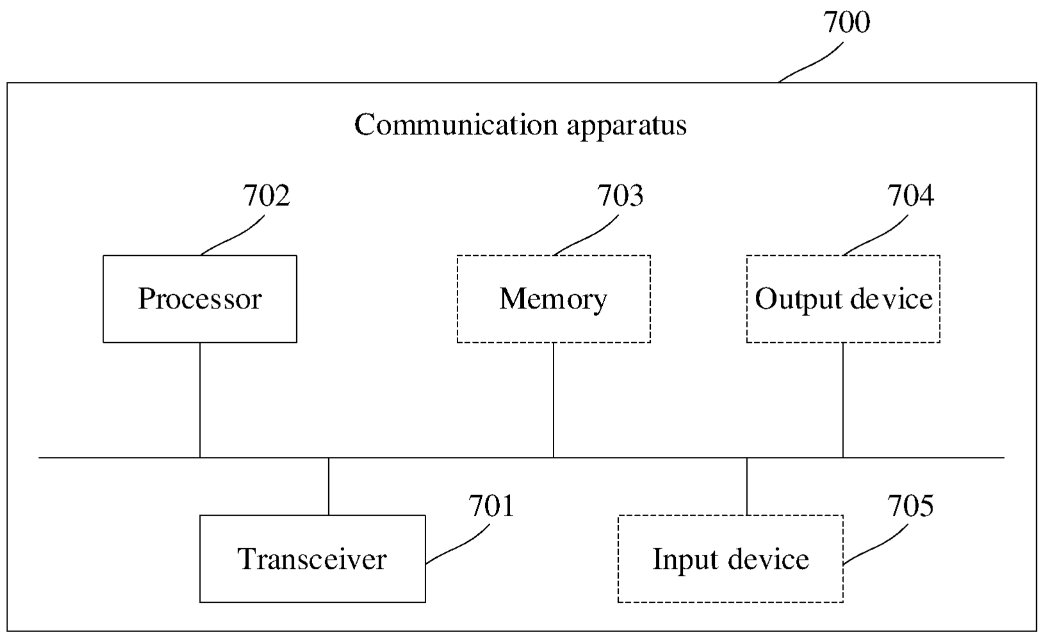
FIG. 7 is a schematic diagram of a communication apparatus according to an embodiment of this application.

Based on the foregoing embodiments and a same concept, an embodiment of this application further provides a communication apparatus, configured to implement a function of the first node, the second node, or the management node provided in embodiments of this application. FIG. 7 shows a communication apparatus 700 according to an embodiment of this application. The communication apparatus 700 may be a first node, or may be a chip or a chip system in a first node; or the communication apparatus 700 may be a second node, or may be a chip or a chip system in a second node; or the communication apparatus 700 may be a management node, or may be a chip or a chip system in a management node.

Specifically, the communication apparatus 700 includes a transceiver 701 and at least one processor 702. The processor 702 and the transceiver 701 are coupled to each other. In embodiments of this application, the coupling is an indirect coupling or a communication connection between apparatuses, units, or modules, may be in an electrical, mechanical, or another form, and is used for information exchange between the apparatuses, units, or modules.

Specifically, the transceiver 701 may be a circuit, a bus, a communication interface, or any other module that may be configured to perform information exchange, and may be configured to receive or send information.

Optionally, the communication apparatus 700 may further include a memory 703.

The memory 703 is coupled to the transceiver 701 and the processor 702, and is configured to store program instructions.

The processor 702 is configured to invoke the program instructions stored in the memory 703, to enable the communication apparatus 700 to perform the method performed by the first node, the second node, or the management node in the ranging rate switch control method provided in embodiments of this application.

The transceiver 701 is configured to receive and send a radio frequency signal, and is coupled to a receiver and a transmitter of the communication apparatus 700. The transceiver 701 communicates with a communication network and another communication apparatus by using the radio frequency signal, for example, a wireless local area network (WLAN), a Bluetooth communication network, or a UWB. In a specific implementation, communication protocols supported by the transceiver 701 include at least a UWB protocol, and may further include protocols related to short-range wireless communication, such as a Bluetooth protocol and a Wi-Fi protocol.

In a specific implementation, the memory 703 may include a high-speed random access memory, and may also include a non-volatile memory, for example, one or more magnetic disk storage devices, a flash memory device, or another non-volatile solid-state storage device. The memory 703 may store an operating system (briefly referred to as a system below), for example, an embedded operating system such as ANDROID, IOS, WINDOWS, or LINUX. The memory 703 may be configured to store an implementation program in embodiments of this application. The memory 703 may further store a network communication program. The network communication program may be configured to communicate with one or more additional devices, one or more user equipment, or one or more network devices.

The processor 702 may be a central processing unit (CPU), a microprocessor, an application-specific integrated circuit (ASIC), or one or more integrated circuits configured to control program execution of the solutions in this application.

In some embodiments, the communication apparatus 700 may further include an output device 704 and an input device 705. The output device 704 communicates with the processor 702, and may display information in a plurality of manners. For example, the output device 704 may be a liquid crystal display (LCD), a light emitting diode (LED) display device, a cathode ray tube (CRT) display device, or a projector. The input device 705 communicates with the processor 702, and may receive user input in a plurality of manners. For example, the input device 705 may be a mouse, a keyboard, a touchscreen device, or a sensing device. For ease of user use of the output device 704 and the input device 705, in some embodiments, the memory 703 may further store a user interface program. The user interface program may vividly display content of an application through a graphical operating interface, and receive a control operation of a user on the application through an input control, for example, a menu, a dialog box, or a key.

It should be noted that FIG. 7 is merely an implementation of embodiments of this application. In the actual application, the communication apparatus 700 may further include more or fewer components. This is not limited herein.

In an example, when the communication apparatus 700 is used in the first node in the foregoing embodiment, the transceiver 701 is configured to: when performing a current UWB ranging process with a second node, receive rate indication information from the second node, where the rate indication information indicates a first data transmission rate available to the second node; and the processor 702 is configured to determine, based on the first data transmission rate indicated by the rate indication information and communication link quality of the first node, a target ranging rate at which a next UWB ranging process is performed with the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, when determining, based on the first data transmission rate indicated by the rate indication information and the communication link quality of the first node, the target ranging rate at which the next UWB ranging process is performed with the second node, the processor 702 is specifically configured to: determine a second data transmission rate of the first node based on the communication link quality of the first node, where the second data transmission rate is a data transmission rate corresponding to a second link quality parameter in the plurality of candidate data transmission rates, and the second link quality parameter indicates the communication link quality of the first node; and determine the target ranging rate based on the first data transmission rate and the second data transmission rate.

In a possible design, when determining the target ranging rate based on the first data transmission rate and the second data transmission rate, the processor 702 is specifically configured to: when the first data transmission rate is the same as the second data transmission rate and is different from a data transmission rate used in performing the current UWB ranging process, use the first data transmission rate as the target ranging rate by the first node; or when the first data transmission rate is different from the second data transmission rate or the first data transmission rate is the same as a data transmission rate used in performing the current UWB ranging process, use the data transmission rate used in performing the current UWB ranging process as the target ranging rate by the first node.

In a possible design, the processor 702 is further configured to: when the first data transmission rate is used as the target ranging rate, send a rate switch indication to the second node through the transceiver 701, where the rate switch indication indicates the second node to switch a ranging rate of the second node to the target ranging rate when the next UWB ranging process is performed; and switch a ranging rate of the first node to the target ranging rate when the next UWB ranging process is performed.

In a possible design, when sending the rate switch indication to the second node through the transceiver 701, the processor 702 is specifically configured to enable the transceiver 701 to send the rate switch indication to the second node through forwarding by a management node, where the management node is configured to manage the first node and the second node.

In a possible design, before the transceiver 701 receives the rate indication information from the second node, the transceiver 701 is further configured to send a rate switch request to the second node, where the rate switch request requests the second node to feed back the rate indication information.

In a possible design, when sending the rate switch request to the second node, the transceiver 701 is specifically configured to send a first ranging frame that carries the rate switch request to the second node, where the first ranging frame indicates the second node to feed back a second ranging frame; and when receiving the rate indication information from the second node, the transceiver 701 is specifically configured to receive the second ranging frame that carries the rate indication information from the second node by the first node.

In an example, when the communication apparatus 700 is used in the second node in the foregoing embodiment, the processor 702 is configured to: when performing a current UWB ranging process with a first node, send rate indication information to the first node through the transceiver 701, so that the first node determines, based on the first data transmission rate indicated by the rate indication information and communication link quality of the first node, a target ranging rate at which a next UWB ranging process is performed with the second node, where the rate indication information indicates the first data transmission rate available to the second node.

In a possible design, the first data transmission rate is a data transmission rate corresponding to a first link quality parameter in a plurality of candidate data transmission rates, where different data transmission rates correspond to different link quality parameters, and the first link quality parameter indicates communication link quality of the second node. The rate indication information includes: first information indicating the first data transmission rate, or second information indicating the first link quality parameter corresponding to the first data transmission rate.

In a possible design, the processor 702 is further configured to: receive a rate switch indication from the first node through the transceiver 701; and switch, based on the rate switch indication, a ranging rate of the second node to a target ranging rate when a next ranging process is performed with the first node.

In a possible design, the receiving, by the processor 702, a rate switch indication from the first node through the transceiver 701 includes: enabling the transceiver 701 to receive the rate switch indication that is from the first node and forwarded by a management node, where the management node is configured to manage the first node and the second node.

In a possible design, before the processor 702 sends the rate indication information to the first node through the transceiver 701, the processor 702 is further configured to receive a rate switch request from the first node through the transceiver 701, where the rate switch request requests the second node to feed back the rate indication information.

In a possible design, when receiving the rate switch request from the first node through the transceiver 701, the processor 702 is specifically configured to receive, through the transceiver 701, a first ranging frame that is from the first node and that carries the rate switch request, where the first ranging frame indicates the second node to feed back a second ranging frame; and when sending the rate indication information to the first node through the transceiver 701, the processor 702 is specifically configured to send the second ranging frame that carries the rate indication information to the first node through the transceiver 701.

In an example, when the communication apparatus 700 is used in the management node in the foregoing embodiment, the processor 702 is configured to: when a current UWB ranging process is performed by a first node and a second node, receive a rate switch indication from the first node through the transceiver 701, where the rate switch indication indicates the second node to switch a ranging rate of the second node to a target ranging rate when a next UWB ranging process is performed with the first node. The processor 702 sends the rate switch indication to the second node through the transceiver 701.

In a possible design, the processor 702 is further configured to send the rate switch indication to the first node through the transceiver 701, where the rate switch indication further indicates the first node to switch a ranging rate of the first node to the target ranging rate when the next UWB ranging process is performed.

Figure 8:
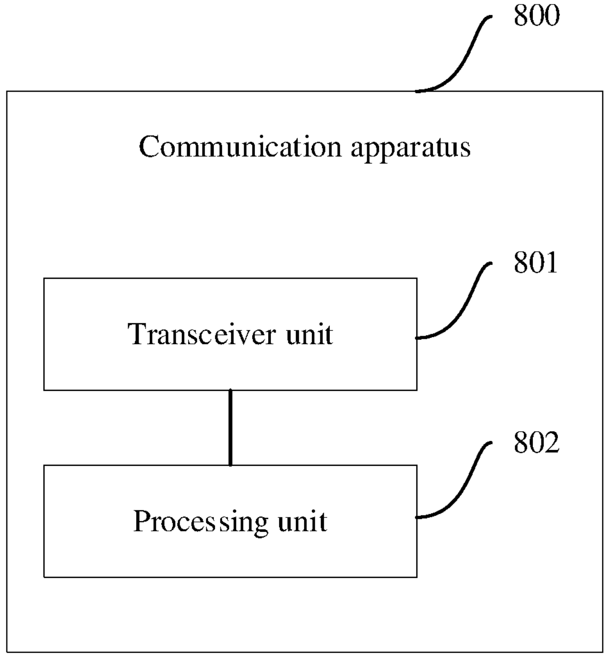
FIG. 8 is a schematic structural diagram of a communication apparatus according to an embodiment of this application.

Based on the foregoing embodiments and a same concept, an embodiment of this application further provides a communication apparatus, configured to implement a function of the first node, the second node, or the management node provided in embodiments of this application. FIG. 8 shows a communication apparatus 800 according to an embodiment of this application. The communication apparatus 800 may be a terminal device, or may be a chip or a chip system in a terminal device.

Specifically, the communication apparatus 800 includes a transceiver unit 801 and a processing unit 802. The transceiver unit 801 is configured to receive a signal from another communication apparatus other than the communication apparatus 800, and transmit the signal to the processing unit 802, or send a signal from the processing unit 802 to another communication apparatus other than the communication apparatus 800.

When the communication apparatus 800 is used in the first node in the foregoing embodiment, the transceiver unit 801 cooperates with the processing unit 802, and may be configured to perform the method that is performed by the first node and that is provided in embodiments of this application.

When the communication apparatus 800 is used in the second node in the foregoing embodiment, the transceiver unit 801 cooperates with the processing unit 802, and may be configured to perform the method that is performed by the second node and that is provided in embodiments of this application.

When the communication apparatus 800 is used in the management node in the foregoing embodiment, the transceiver unit 801 cooperates with the processing unit 802, and may be configured to perform the method that is performed by the management node and that is provided in embodiments of this application.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Based on the foregoing embodiments and a same concept, an embodiment of this application further provides a communication system. The communication system includes at least the first node and the second node provided in the foregoing embodiments. Optionally, the communication system may further include the management node provided in the foregoing embodiments.

Based on the foregoing embodiments and a same concept, an embodiment of this application further provides a computer-readable storage medium. The computer-readable storage medium stores a computer-readable program. When the computer-readable program is run on a computer, the computer is enabled to perform the ranging rate switch control method that is provided in the foregoing embodiments and that is used in the first node, the second node, or the management node.

Based on the foregoing embodiments and a same concept, an embodiment of this application further provides a computer program product. When the computer program product is run on a computer, the computer is enabled to perform the ranging rate switch control method that is provided in the foregoing embodiments and that is used in the first node, the second node, or the management node.

Based on the foregoing embodiments and a same concept, an embodiment of this application further provides a chip. The chip is configured to read a computer program stored in a memory, to perform the ranging rate switch control method that is provided in the foregoing embodiments and that is used in the first node, the second node, or the management node.

Based on the foregoing embodiments and a same concept, an embodiment of this application further provides a chip system. The chip system includes a processor, configured to support a communication apparatus in implementing the ranging rate switch control method that is provided in the foregoing embodiments and that is used in the first node, the second node, or the management node.

In a possible design, the chip system further includes a memory, and the memory is configured to store a program and data that are necessary for the computer apparatus.

In a possible design, the chip system includes a chip, or includes a chip and another discrete device.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A ranging rate switch control method, comprising:

sending, by a first node, a first ranging frame that carries a rate switch request to a second node, wherein the first ranging frame indicates the second node to feed back a second ranging frame, and the rate switch request requests the second node to feed back rate indication information:

receiving, by the first node, the second ranging frame that is from the second node and that carries rate indication information, during a performance of a current ultra wide band (UWB) ranging process with the second node, wherein the rate indication information indicates a first data transmission rate available to the second node; and determining, by the first node based on the first data transmission rate and communication link quality of the first node, a target ranging rate at which a next UWB ranging process is to be performed with the second node.

2. The method according to claim 1, wherein the first data transmission rate corresponds to a first link quality parameter in a plurality of candidate data transmission rates, wherein different data transmission rates correspond to different link quality parameters, and the first link quality parameter indicates communication link quality of the second node; and the rate indication information comprises: first information indicating the first data transmission rate, or second information indicating the first link quality parameter corresponding to the first data transmission rate.

3. The method according to claim 2, wherein the determining the target ranging rate comprises:

determining, by the first node, a second data transmission rate of the first node based on the communication link quality of the first node, wherein the second data transmission rate corresponds to a second link quality parameter in the plurality of candidate data transmission rates, and the second link quality parameter indicates the communication link quality of the first node; and determining, by the first node, the target ranging rate based on the first data transmission rate and the second data transmission rate.

4. The method according to claim 3, wherein the determining the target ranging rate based on the first data transmission rate and the second data transmission rate comprises:

based on the first data transmission rate being the same as the second data transmission rate and the first data transmission rate being different from a data transmission rate used in performing the current UWB ranging process, using, by the first node, the first data transmission rate as the target ranging rate; or based on the first data transmission rate being different from the second data transmission rate or the first data transmission rate being the same as the data transmission rate used in performing the current UWB ranging process, using, by the first node, the data transmission rate used in performing the current UWB ranging process as the target ranging rate.

5. The method according to claim 4, further comprising:

in response to the first node using the first data transmission rate as the target ranging rate, sending, by the first node, a rate switch indication to the second node, wherein the rate switch indication indicates the second node to switch a ranging rate of the second node to the target ranging rate; and switching, by the first node, a ranging rate of the first node to the target ranging rate.

6. The method according to claim 5, wherein the sending the rate switch indication to the second node comprises:

sending, by the first node, the rate switch indication to the second node through forwarding by a management node, wherein the management node is configured to manage the first node and the second node.

7. A ranging rate switch control method, comprising:

receiving, by a second node, a first ranging frame from a first node, the first ranging frame carrying a rate switch request, wherein the first ranging frame indicates the second node to feed back a second ranging frame, and the rate switch request requests the second node to feed back rate indication information;

sending, by the second node, the second ranging frame that carries rate indication information to the first node, during a performance of a current ultra wide band (UWB) ranging process with the first node, wherein the rate indication information indicates a first data transmission rate available to the second node.

8. The method according to claim 7, wherein the first data transmission rate corresponds to a first link quality parameter in a plurality of candidate data transmission rates, wherein different data transmission rates correspond to different link quality parameters, and the first link quality parameter indicates communication link quality of the second node; and the rate indication information comprises: first information indicating the first data transmission rate, or second information indicating the first link quality parameter corresponding to the first data transmission rate.

9. The method according to claim 7, further comprising:

receiving, by the second node, a rate switch indication from the first node; and switching, by the second node based on the rate switch indication, a ranging rate of the second node to a target ranging rate at which a next ranging process is to be performed with the first node.

10. The method according to claim 9, wherein the receiving the rate switch indication from the first node comprises:

receiving, by the second node, the rate switch indication that is from the first node and forwarded by a management node, wherein the management node is configured to manage the first node and the second node.

11. A communication apparatus in a first node, wherein the communication apparatus comprises a transceiver and a processor, wherein the transceiver is configured to: send a first ranging frame that carries a rate switch request to a second node, wherein the first ranging frame indicates the second node to feed back a second ranging frame, and the rate switch request requests the second node to feed back rate indication information; and receive the second ranging frame from the second node, the second ranging frame carrying rate indication information, during a performance of a current ultra wide band (UWB) ranging process with the second node, wherein the rate indication information indicates a first data transmission rate available to the second node; and the processor is configured to determine, based on the first data transmission rate indicated by the rate indication information and communication link quality of the first node, a target ranging rate at which a next UWB ranging process is to be performed with the second node.

12. The communication apparatus according to claim 11, wherein the first data transmission rate corresponds to a first link quality parameter in a plurality of candidate data transmission rates, wherein different data transmission rates correspond to different link quality parameters, and the first link quality parameter indicates communication link quality of the second node; and the rate indication information comprises: first information indicating the first data transmission rate, or second information indicating the first link quality parameter corresponding to the first data transmission rate.

13. The communication apparatus according to claim 12, wherein in determining the target ranging rate, the processor is further configured to:

determine a second data transmission rate of the first node based on the communication link quality of the first node, wherein the second data transmission rate corresponds to a second link quality parameter in the plurality of candidate data transmission rates, and the second link quality parameter indicates the communication link quality of the first node; and determine the target ranging rate based on the first data transmission rate and the second data transmission rate.

14. The communication apparatus according to claim 13, wherein in determining the target ranging rate based on the first data transmission rate and the second data transmission rate, the processor is further configured to:

based on the first data transmission rate being the same as the second data transmission rate and the first data transmission rate being different from a data transmission rate used in performing the current UWB ranging process, use the first data transmission rate as the target ranging rate; or based on the first data transmission rate being different from the second data transmission rate or the first data transmission rate being the same as the data transmission rate used in performing the current UWB ranging process, use the data transmission rate used in performing the current UWB ranging process as the target ranging rate.

15. The communication apparatus according to claim 14, wherein the processor is further configured to:

in response to the first data transmission rate being used as the target ranging rate, send a rate switch indication to the second node through the transceiver, wherein the rate switch indication indicates the second node to switch a ranging rate of the second node to the target ranging rate; and switch a ranging rate of the first node to the target ranging rate.

16. The communication apparatus according to claim 15, wherein in sending the rate switch indication to the second node through the transceiver, the processor is further configured to:

enable the transceiver to send the rate switch indication to the second node through forwarding by a management node, wherein the management node is configured to manage the first node and the second node.

* * * * *